United States Patent
Park et al.

(10) Patent No.: US 12,506,506 B2
(45) Date of Patent: Dec. 23, 2025

(54) ELECTRONIC DEVICE FOR COMMUNICATION AND OPERATION METHOD THEREOF

(71) Applicant: Samsung Electronics Co., Ltd., Gyeonggi-do (KR)

(72) Inventors: Sangkyung Park, Gyeonggi-do (KR); Kyeongmin Kim, Gyeonggi-do (KR); Seungho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 18/071,818

(22) Filed: Nov. 30, 2022

(65) Prior Publication Data
US 2023/0133467 A1 May 4, 2023

Related U.S. Application Data

(63) Continuation of application No. PCT/KR2022/016869, filed on Nov. 1, 2022.

(30) Foreign Application Priority Data

Nov. 1, 2021 (KR) .......................... 10-2021-0147954

(51) Int. Cl.
*H04B 1/3877* (2015.01)
*H04W 4/00* (2018.01)

(52) U.S. Cl.
CPC ............ *H04B 1/3877* (2013.01); *H04W 4/00* (2013.01)

(58) Field of Classification Search
CPC .................................................. H04B 1/3877
See application file for complete search history.

(56) References Cited

U.S. PATENT DOCUMENTS

| | | |
|---|---|---|
| 10,142,750 B2 | 11/2018 | Hariharan et al. |
| 10,256,653 B2 | 4/2019 | Yoon et al. |
| 10,958,094 B2 | 3/2021 | Choi et al. |
| 11,025,084 B2 | 6/2021 | Ding et al. |
| 2017/0263376 A1* | 9/2017 | Verschueren .......... H01Q 1/273 |

(Continued)

FOREIGN PATENT DOCUMENTS

| | | |
|---|---|---|
| KR | 1992-0005514 A | 3/1992 |
| KR | 10-2020-0012534 A | 2/2020 |

(Continued)

OTHER PUBLICATIONS

International Search Report dated Feb. 17, 2023.

*Primary Examiner* — Hsinchun Liao
(74) *Attorney, Agent, or Firm* — Cha & Reiter, LLC.

(57) ABSTRACT

A cradle, first wireless communication device, and second wireless communication device, and method thereof, are disclosed. The first wireless device receives a first short-range wireless communication signal requesting activation of data communication with the cradle, detects electrical connection to the cradle, receive a second short-range wireless communication signal indicating that the second wireless communication device is electrically connected to the cradle, and transmit a third short-range wireless communication signal requesting the second wireless communication device to activate the power line communication. The second wireless device and cradle may execute corresponding and complimentary operations thereof.

20 Claims, 14 Drawing Sheets

(56) References Cited

U.S. PATENT DOCUMENTS

| | | | |
|---|---|---|---|
| 2018/0248414 A1* | 8/2018 | Liu | ........................ H02J 7/00 |
| 2020/0321792 A1 | 10/2020 | Rhee et al. | |
| 2020/0336820 A1* | 10/2020 | Tasaka | .................. G11B 33/04 |
| 2021/0050960 A1 | 2/2021 | Jang et al. | |
| 2021/0160955 A1 | 5/2021 | Zhong | |
| 2021/0203380 A1 | 7/2021 | Lee et al. | |
| 2022/0271796 A1 | 8/2022 | Lee et al. | |
| 2023/0052144 A1 | 2/2023 | Yang et al. | |

FOREIGN PATENT DOCUMENTS

| | | |
|---|---|---|
| KR | 10-2020-0117461 A | 10/2020 |
| KR | 10-2021-0020541 A | 2/2021 |
| KR | 10-2021-0082979 A | 7/2021 |
| KR | 10-2021-0101702 A | 8/2021 |
| KR | 10-2021-0128118 A | 10/2021 |

* cited by examiner

ELECTRONIC DEVICE FOR COMMUNICATION AND OPERATION METHOD THEREOF

CROSS-REFERENCE TO RELATED APPLICATION(S)

This application is a continuation of International Application No. PCT/KR2022/016869, which was filed on Nov. 1, 2022, and claims priority to Korean Patent Application No. 10-2021-0147954, filed on Nov. 1, 2021, in the Korean Intellectual Property Office, the disclosures of which are incorporated by reference herein their entirety.

BACKGROUND

Technical Field

Various embodiments disclosed in this document relate to cradle housing wireless audio devices, and more particular, to using stowed wireless audio devices as surrogate wireless communication devices for the cradle.

Description of Related Art

With the development of digital technology, various electronic devices, such as earphones, earbuds, wireless speakers, or wireless headsets, are becoming popular for use in outputting audio data reproduced via an audio source device, such as a mobile communication terminal, a personal digital assistant (PDA), an electronic notebook, a smartphone, a tablet personal computer (PC), or a wearable device. Such an electronic device may receive audio data from the audio source device through a wireless communication connection with the audio source device.

The electronic device may output audio data using a wireless earphone device. The wireless earphone device may include two wireless earphones (e.g., left/right earphone or first/second wireless communication device) for receiving sound data from the electronic device and outputting the sound data to user, and a cradle for housing and charging the two wireless earphones.

In relation to the above-described wireless communication connection technology, the Bluetooth® may be utilized as a protocol for facilitating short-range wireless communication between electronic devices. In a Bluetooth® network environment, electronic devices transmit or receive data packets including content such as text, voice, image, audio, or video via a designated frequency band. For example, a user equipment (UE) such as a smartphone, a tablet, a desktop computer, or a laptop computer may transmit data packets to other user terminals or accessory devices using the specified frequency band.

A cradle for charging or storing a first wireless communication device (e.g., a wireless earphone) may not include a wireless communication module, and thus may be unable to transmit/receive data to/from an electronic device (e.g., a mobile phone). For example, the cradle may be unable to perform a download operation, such as firmware update.

According to embodiments according to the disclosure, data may be transmitted and received between the cradle and the electronic device using a first wireless communication device or a second wireless communication device stowed in the cradle.

In addition, according to embodiments according to the disclosure, when data is transmitted from a wireless communication device (e.g., a first wireless communication device or a second wireless communication device) to the cradle, data communication speed may be improved by dividing total transmitted data between the first wireless communication device and the second wireless communication device for transmission and/or reception.

SUMMARY

A first wireless communication device according to an embodiment of the disclosure includes a power management module configured to electrically connect with a cradle and execute power line communication; a communication module configured to wirelessly communicate with an electronic device and a second wireless communication device; and at least one processor electrically connected to the communication module and the power management module, wherein the at least one processor is configured to: receive a first short-range wireless communication signal requesting activation of data communication with the cradle from the electronic device via the communication module, detect electrical connection of the first wireless communication device to the cradle, receive a second short-range wireless communication signal indicating that the second wireless communication device is electrically connected to the cradle from the second wireless communication device via the communication module, and in response to receiving the second short-range wireless communication signal, transmit a short-range wireless communication signal requesting the second wireless communication device to activate the power line communication through the communication module, in response to receiving the short-range wireless communication signal.

A cradle according to an embodiment of the disclosure includes a first connector configured to electrically connect to a first power management module of a first wireless communication device; a second connector configured to electrically connect to a second power management module of a second wireless communication device; and at least one processor electrically connected to the first connector and the second connector, wherein the at least one processor is configured to: receive a first power line communication signal requesting activation of power line communication of the cradle with the second wireless communication device from the second wireless communication device via the second connector, wherein the received power line communication signal includes data related to a power line communication operation of the cradle with the second wireless communication device, and receive a second power line communication signal including first data on firmware of the cradle over the first wireless communication device via the first connector.

An operation method of a first wireless communication device according to an embodiment of the disclosure includes: receiving a first short-range wireless communication signal requesting activation of data communication with a cradle from an electronic device; detecting, via at least one processor, that the first wireless communication device is electrically connected to the cradle; receiving a second short-range wireless communication signal indicating that a second wireless communication device is electrically connected to the cradle from the second wireless communication device; transmitting a third short-range wireless communication signal to the second wireless communication device requesting activation of power line communication, in response to the reception of the second short-range wireless communication signal; and transmitting a first power line communication signal requesting the second wireless communication to activate the power line communication to the cradle. A wireless communication device according to an embodiment may provide a beneficial effect of enabling two-way data communication through high-speed power line communication (HPLC), in communication between a wireless communication device (e.g., an earbud) and a cradle.

A wireless communication device according to an embodiment may provide a beneficial effect of reducing the time required for data transmission by dividing and transmitting data from two wireless communication devices to a cradle based on HPLC.

A wireless communication device according to an embodiment may provide a beneficial effect of enabling a cradle to accurately receive data by transmitting the same data to the cradle from two wireless communication devices based on HPLC.

Effects that can be obtained in the disclosure are not limited to the effects mentioned above, and other effects not mentioned will be clearly understood by those of ordinary skill in the art to which the disclosure belongs from the following description.

DETAILED DESCRIPTION

Hereinafter, various embodiments of the disclosure will be described with reference to the accompanying drawings. However, this is not intended to limit the disclosure to specific embodiments, and should be understood to include various modifications, equivalents, and/or alternatives of the embodiments.

Figure 1:
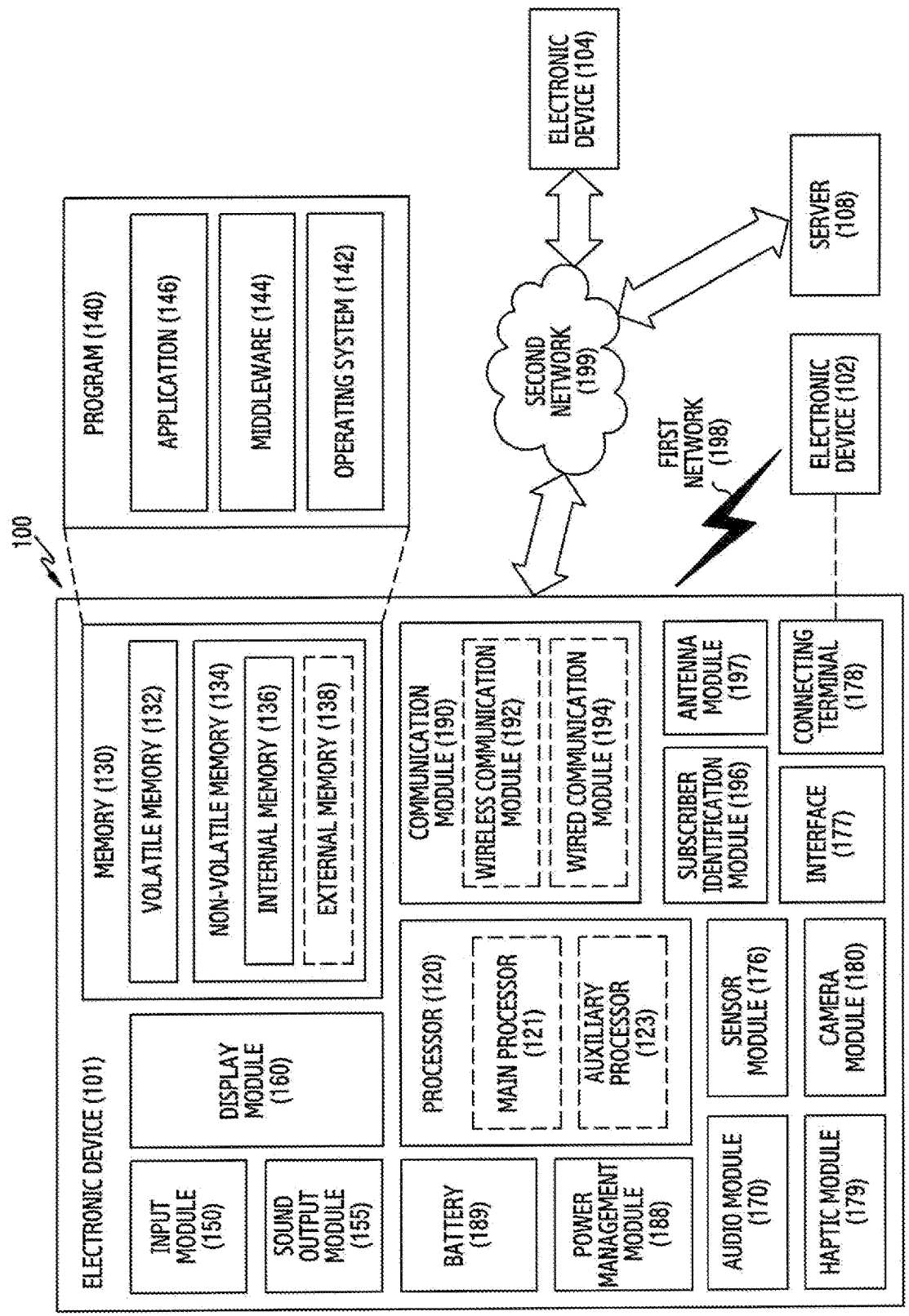
FIG. 1 is a block diagram illustrating an electronic device in a network environment according to an embodiment.

FIG. 1 is a block diagram illustrating an electronic device in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output sound signals to the external environment of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to a viewer (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth®, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from another device (e.g., the external electronic device). According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
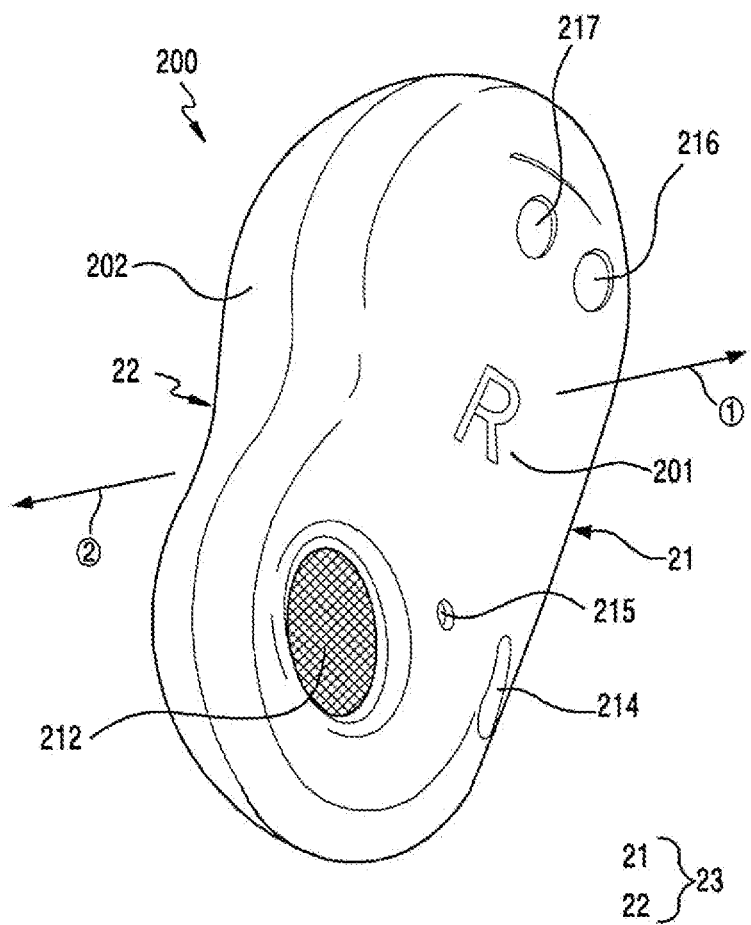
FIG. 2A illustrates an example of a wireless communication device according to an embodiment.
Figure 2B:
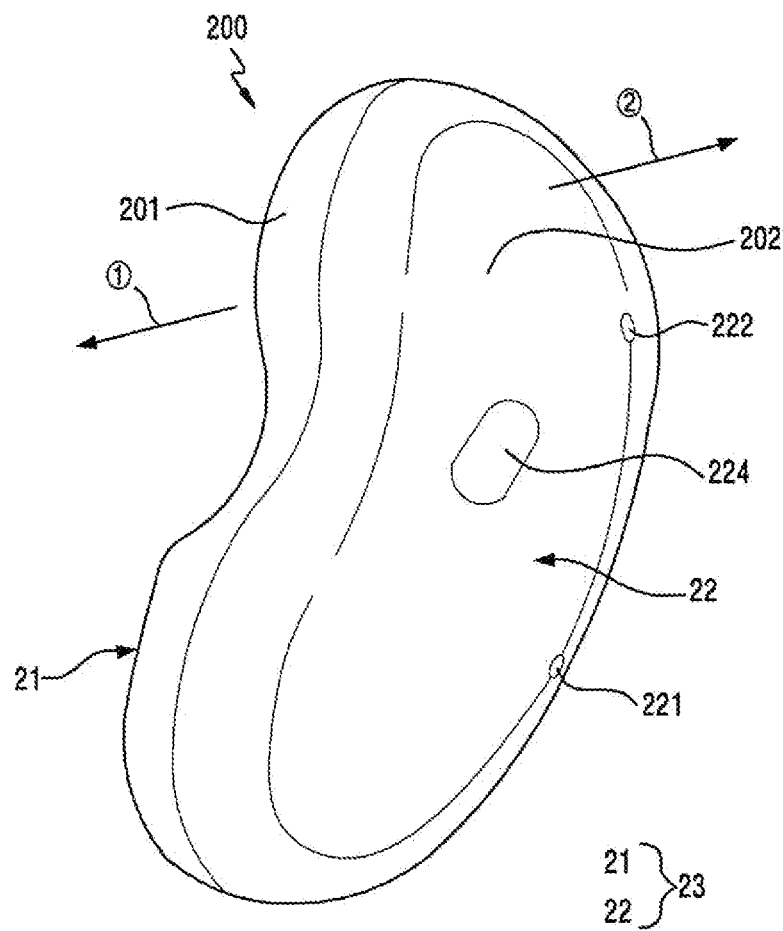
FIG. 2B illustrates an example of a wireless communication device according to an embodiment.
Figure 2C:
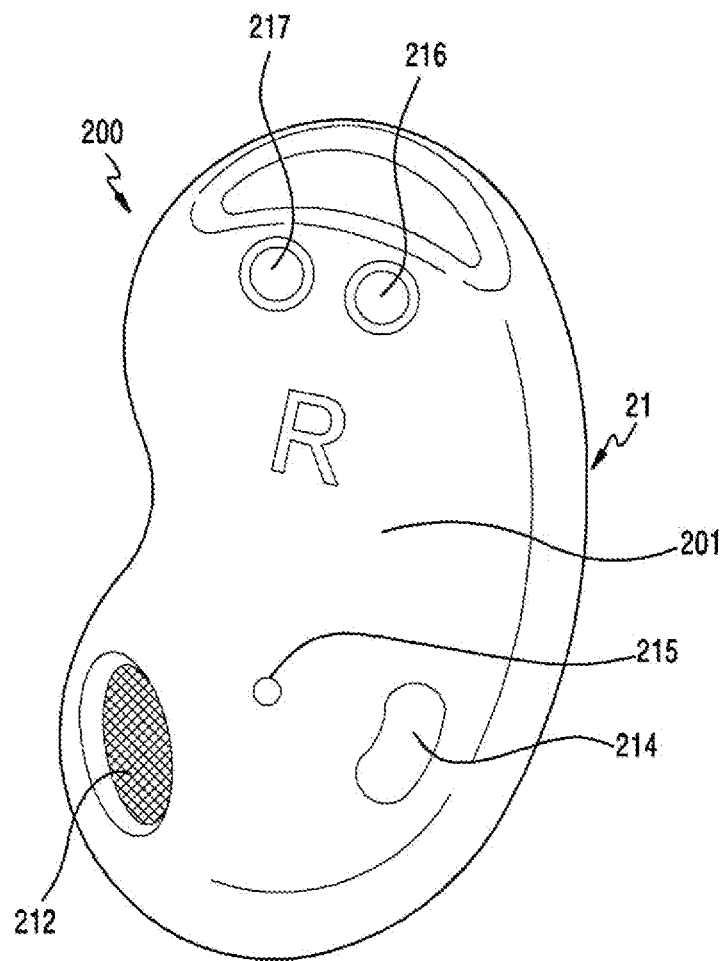
FIG. 2C illustrates an example of a wireless communication device according to an embodiment.
Figure 2D:
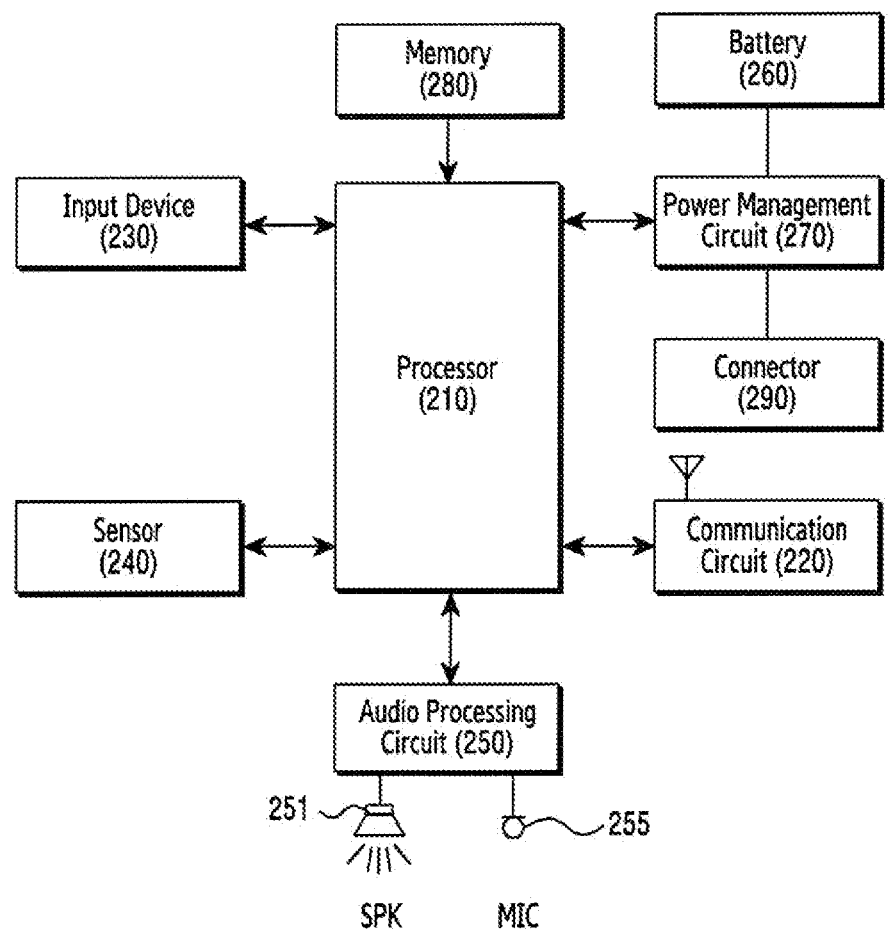
FIG. 2D is a block diagram illustrating a wireless communication device according to an embodiment.

FIG. 2A illustrates an example of a wireless communication device according to an embodiment. FIG. 2B illustrates an example of a wireless communication device according to an embodiment. FIG. 2C illustrates an example of a wireless communication device according to an embodiment. FIG. 2D is a block diagram illustrating a wireless communication device according to an embodiment. A wireless communication device 200 illustrated in FIGS. 2A to 2D may be a wearable device that can be worn on an ear. The wireless communication device 200 may be a wearable device that can be worn on a user's ear. For example, the wireless communication device 200 may be a right wireless earphone of a pair of wireless earphones (e.g., a left wireless earphone and a right wireless earphone).

FIGS. 2A and 2B are perspective views illustrating the appearance of the wireless communication device 200 according to an embodiment. FIG. 2C is a plan view illustrating the appearance of the wireless communication device 200 according to an embodiment.

According to an embodiment, the wireless communication device 200 may be a wearable device formed to be worn on the right ear. The wireless communication device 200 may include a first surface 201 and a second surface 202. The English alphabet "R" indicating that the wireless communication device 200 is a wearable device worn on the right ear may be displayed on the first surface 201. Although not shown in FIG. 2A, the English alphabet "L" indicating that the electronic device paired with the wireless communication device 200 and worn on the left ear is a wearable device worn on the left ear may be displayed on a surface corresponding to the first side 201 of the wireless communication device 200.

According to an embodiment, the wireless communication device 200 may include a housing 23 in which a plurality of components are mounted. The housing 23 may include a first housing 21 including the first surface 201 facing a first direction ① and a second housing 22 including the second surface 202 facing a second direction ②. The first direction ① and the second direction ② may be opposite to each other. For example, a portion of the first surface 201 and the second surface 202 may include a curved surface.

According to an embodiment, the first surface 201 of the first housing 21 may include a speaker nozzle unit (or an audio port having a sound hole) 212, a first port 214, and at least one charging terminal 216 and 217. Sound output from a speaker disposed inside the housing 23 may be output to an external environment through the audio port having the sound hole.

According to an embodiment, the speaker nozzle unit 212 may be disposed on one surface (e.g., the first surface 201 and the second surface 202) of the housing 23 so that the sound output from the speaker disposed inside the housing 23 is output (or propagated) to the external environment of the wireless communication device 200 through the audio ports disposed on one surface (e.g., the first surface 201 and the second surface 202) of the housing 23. For example, the speaker nozzle unit 212 may be disposed on the first surface 201 of the first housing 21 so that the sound output from the speaker disposed inside the housing 23 is transmitted (or propagated) to the external environment of the wireless communication device 200 through at least one audio port disposed on the first surface 201 of the first housing 21. The speaker nozzle unit 212 may include at least one opening, and may be made of at least one of a metal material and a polymer material. The speaker nozzle unit 212 may include a foreign material preventing member for preventing the inflow of foreign substances (e.g., dust, moisture, etc.). The speaker nozzle unit 212 may be exposed to the external environment of the wireless communication device 200 through at least a portion of the first surface 201.

According to an embodiment, the first port 214 may include a leakage port. The first port 214 may be exposed to the external environment of the wireless communication device 200 through at least a portion of the first surface 201.

According to an embodiment, the at least one charging terminal 216 and 217 may be disposed as a pair on one surface (e.g., the first surface 201 or the second surface 202) of the housing 23, and may be exposed to the external environment of the electronic device 20 through the one surface. For example, the at least one charging terminal 216 or 217 may be exposed to the external environment of the wireless communication device 200 through the first surface 201 of the housing 23.

According to an embodiment, the wireless communication device 200 may include a sensor (e.g., a proximity sensor or a biometric sensor) that detects whether the wireless communication device 200 is worn by a user. A sensor window 215 may be disposed on one surface (e.g., the first surface 201 or the second surface 202) of the housing 23. For example, the sensor window 215 may be disposed on the first surface 201 of the first housing 21. For example, the sensor window 215 may be positioned between the speaker nozzle unit 212 and the first port 214. The position of the sensor window 215 is not limited to the above-described example. The sensor window 215 may be understood as an opening for operating the sensor to detect whether the wireless communication device 200 is worn by the user.

According to an embodiment, the second surface 202 of the second housing 22 may include at least one microphone hole 221 and 222 and a second port 224.

According to an embodiment, the at least one microphone hole 221 and 222 may be disposed on one surface (e.g., the first surface 201 or the second surface 202) of the housing 13 so that the microphone disposed inside the housing 23 acquires sound. For example, the at least one microphone hole 221 and 222 may be disposed on the second surface 202 of the second housing 22 so that the microphone disposed inside the housing 23 acquires sound.

According to an embodiment, the second port 224 is a port related to the output of the speaker, and may be understood as a port used for tuning the low frequency characteristics of the speaker. The second port 224 may be disposed in a speaker back volume space facing the second direction ②.

According to an embodiment, it has been described on the premise that the wireless communication device 200 is a wearable device worn on the right ear, but at least some of the contents described with reference to FIGS. 2A to 2C may be equally applied even when the wireless communication device 200 is a wearable device worn on the left ear, as they may possess some or all symmetrical features.

FIG. 2D is a block diagram illustrating the wireless communication device 200 according to an embodiment. Components illustrated in FIG. 2D may be included in the wireless communication device 200. Although not shown in the drawings, a counterpart wireless communication device paired with the wireless communication device 200 and worn on the other ear may also include components corresponding to the wireless communication device 200.

Referring to FIG. 2D, the wireless communication device 200 may include a processor 210, a communication circuit 220, an input device 230, a sensor 240, an audio processing circuit 250, a speaker 251, a microphone 255, a battery 260, a power management circuit 270, a memory 280, a connector 290, or a combination thereof.

In an embodiment, the processor 210 may control the overall operation of the wireless communication device 200. The processor 210 may receive data of other components (e.g., the communication circuit 220, the input device 230, the audio processing circuit 250, the power management circuit 270, or the memory 280) of the wireless communication device 200, may interpret the received data, and may perform calculation according to the interpreted data.

In an embodiment, the processor 210 may control the communication circuit 220 so that the wireless communication device 200 establishes (e.g., Bluetooth® pairing) a wireless communication link with the electronic device 101.

In an embodiment, the wireless communication link may refer to a wireless communication path through which two-way communication between the wireless communication device 200 and the electronic device 101 is possible. The wireless communication link between the wireless communication device 200 and the electronic device 101 may be referred to as a first communication link. The wireless communication link between the counterpart wireless communication device and the electronic device 101 may be referred to as a second communication link. The wireless communication link between the wireless communication device and the counterpart wireless communication device may be referred to as a third communication link.

In an embodiment, the processor 210 may receive data from the electronic device 101 by using the communication circuit 220, and may transmit a response (e.g., ACK or NACK) indicating whether the data has been successfully received to the electronic device 101.

In an embodiment, when a wireless communication connection between the wireless communication device 200 and the electronic device 101 is established, the processor 210 may enable the wireless communication device 200 to receive data from the electronic device 101 by using the communication circuit 220. In an embodiment, the data received from the electronic device 101 may be an audio signal or data including information for matching with another wireless communication device.

In an embodiment, the processor 210 may provide data from the electronic device 101 to the audio processing circuit 250. In an embodiment, the audio processing circuit 250 may convert (e.g., decode) the provided data into an audio signal and may output the converted audio signal through the speaker 251.

In an embodiment, the processor 210 may acquire (or identify) a wireless communication parameter related to a wireless communication link. In an embodiment, the processor 210 may store the acquired (or identified) communication parameter in the memory 280. In an embodiment, the processor 210 may transmit the wireless communication parameter to the counterpart wireless communication device through a cradle in which the wireless communication device 200 is mounted. In an embodiment, when a separate wireless communication link (e.g., a third communication link) is established, the processor 210 may transmit a communication parameter to the counterpart wireless communication device through the separate wireless communication link.

In an embodiment, the wireless communication parameter may include address information (e.g., a Bluetooth® address of a master device {e.g., the wireless communication device 200}, a Bluetooth® address of a slave device {e.g., the counterpart wireless communication device}, and a Bluetooth® address of a UE {e.g., the electronic device 101}), piconet clock information (e.g., clock native {CLKN} of the master device {e.g., the wireless communication device 200}), information allocated by a logical transport (LT) address information master device (e.g., the wireless communication device 200), used channel map information, link key information, service discovery protocol (SDP) information (e.g., service and/or profile information associated with the first communication link {or the second communication link}), and/or supported feature information. In an embodiment, the wireless communication parameter may further include an extended inquiry response (EIR) packet. In an embodiment, the EIR packet may include resource control information of the first communication link (or the second communication link) and/or information on the manufacturer.

In an embodiment, the processor 210 may transmit a mode parameter to the counterpart wireless communication device through a cradle electrically connected to the wireless communication device 200 through the connector or a separate wireless communication connection. In an embodiment, when an audio signal corresponding to data received from the electronic device 101 is output through the speaker 251, the mode parameter may include information on a sound effect or audio filter applied to the audio signal. In an embodiment, the mode parameter may include information about an audio output strength or an audio output magnitude applied to the audio signal. In an embodiment, the mode parameter may include information about a configuration of an application being executed in relation to data in the electronic device 101. In an embodiment, the mode parameter may include information about a channel of data (e.g., information about a left (L) channel and information about a Right® channel in the case of a stereo audio signal).

In an embodiment, the processor 210 may transmit a wireless communication connection list to the counterpart electronic device through the cradle electrically connected to the wireless communication device 200 through the connector or a separate wireless communication connection (e.g., the third communication link). In an embodiment, the wireless communication connection list may include a wireless communication connection history between a plurality of wireless communication devices (not shown), a wireless communication connection order, or a combination thereof.

In an embodiment, the processor 210 may receive a wireless communication parameter, a mode parameter, a wireless communication connection list, or a combination thereof through the cradle electrically connected to the wireless communication device 200 via the connector or a separate wireless communication connection (e.g., a third communication link).

In an embodiment, when a wireless communication link between the counterpart wireless communication device and the electronic device 101 is established, the processor 210 may receive, from the counterpart wireless communication device, at least a part of the data from the electronic device 101 through the cradle electrically connected to the wireless communication device 200 through the connector or the separate wireless communication link.

In an embodiment, the processor 210 may output the data received from the counterpart wireless communication device through the cradle electrically connected to the wireless communication device 200 through the connector or the separate wireless communication link (e.g., the third communication link), through the speaker 251.

In an embodiment, the processor 210 may output data acquired from the electronic device 101 through the speaker 251. In an embodiment, the processor 210 may convert (decode) the acquired data into an audio signal by using the audio processing circuit 250, and may output the converted audio signal through the speaker 251. In an embodiment, the processor 210 may output an audio signal for all channels (e.g., channel L and channel R) or a single channel (e.g., channel R) allocated to the wireless communication device 200 through the speaker 251, according to configuration information of the wireless communication device 200.

In an embodiment, the communication circuit 220 may establish a wireless communication link between the wireless communication device 200, the counterpart wireless communication device, and the electronic device 101. In an embodiment, the communication circuit 220 may receive data from the counterpart wireless communication device and the electronic device 101 through the established wireless communication link.

In an embodiment, the input device 230 may receive an input from a user. In an embodiment, the input received from the user may be an input for adjusting the volume of the audio signal output through the wireless communication device 200 or playing a next song.

In an embodiment, the input device 230 may include a touch panel. In an embodiment, the input device 230 may detect a touch input, a swipe, a flick, or a hovering input using the touch panel. In an embodiment, the input device 230 may include a physical key.

In an embodiment, the input device 230 may provide data representing the input received from the user to the processor 210.

In an embodiment, the sensor 240 may generate a sensing value for identifying a communication connection event. In an embodiment, the communication connection event may include wearing of the wireless communication device, attachment/detachment of the wireless communication device to/from the cradle, usage of the wireless communication device, a gesture input, or a combination thereof.

In an embodiment, the audio processing circuit 250 may process a signal related to sound. In an embodiment, the audio processing circuit 250 may acquire a sound signal (e.g., a user's voice signal) through the microphone 255. In an embodiment, the audio processing circuit 250 may convert the sound signal acquired through the microphone 255 into an analog audio signal (e.g., an electrical signal) corresponding to the sound signal. In an embodiment, the audio processing circuit 250 may encode an analog audio signal into a digital audio signal using a codec. In an embodiment, the audio processing circuit 250 may provide the digital audio signal to other components (e.g., the processor 210, the communication circuit 220, and/or the memory 280) of the wireless communication device 200.

In an embodiment, the audio processing circuit 250 may receive a digital audio signal from other components (e.g., the processor 210, the communication circuit 220, the interface, and/or the memory 280) of the wireless communication device 200. In an embodiment, the audio processing circuit 250 may convert a digital audio signal into an analog audio signal through a converter (e.g., a digital-to-analog converter {DAC}). In an embodiment, the audio processing circuit 250 may decode a digital audio signal into an analog audio signal using a codec. In an embodiment, the audio processing circuit 250 may output a sound signal corresponding to the analog audio signal through the speaker 251.

In an embodiment, the battery 260 may supply power to at least one component of the wireless communication device 200. In an embodiment, the battery 260 may be charged when the wireless communication device 200 is mounted (or electrically connected) to a designated power supply device (cradle) through a connector (not shown).

In an embodiment, the power management circuit 270 may manage power supplied to the wireless communication device through the battery 260. For example, the power management circuit 270 may be configured as at least a portion of a power management integrated circuit (PMIC).

In an embodiment, the power management circuit 270 may measure the amount of power of the battery 260 of the wireless communication device 200. In an embodiment, the power management circuit 270 may provide information about the amount of power of the battery 260 to the processor 210. In an embodiment, the processor 210 may transmit information about the remaining amount of the battery 260 of the wireless communication device 200 to the electronic device 101. In an embodiment, the amount of power of the battery 260 of the wireless communication device 200 may be used when the wireless communication device 200 performs negotiation on the master device with the counterpart wireless communication device. In an embodiment, one device of the wireless communication device 200 and the counterpart wireless communication device may be determined as the master device based on the amount of power between the wireless communication device 200 and the counterpart wireless communication device, and the other electronic device may be determined as the slave device.

In an embodiment, the wireless communication device 200 may include a connector 290 for electrically connecting the wireless communication device 200 to a power supply device (e.g., a cradle).

In an embodiment, the connector 290 may include at least one contact (or terminal) disposed on the outer surface of the housing. For example, when the wireless communication device 200 is mounted in the connector of the cradle during stowing within the cradle, the connector 290 of the wireless communication device 200 may be electrically connected to the connector (e.g., a flexible terminal such as a pogo pin) included in the cradle.

In an embodiment, the connector 290 may receive power charging the battery 260 from the cradle, and may transmit the received power to the power management circuit 270.

In an embodiment, the wireless communication device 200 may perform high-speed power line communication (HPLC) communication or power line communication (PLC) communication with the cradle through the connector 290. A speed (e.g., 40 KB) of data communication via HPLC may be higher than a speed (e.g., 2.2 KB) of data communication via PLC. A voltage (e.g., 1.8V) required for HPLC may be smaller than a voltage (e.g., 5V {charging voltage}) required for PLC.

Figure 3A:
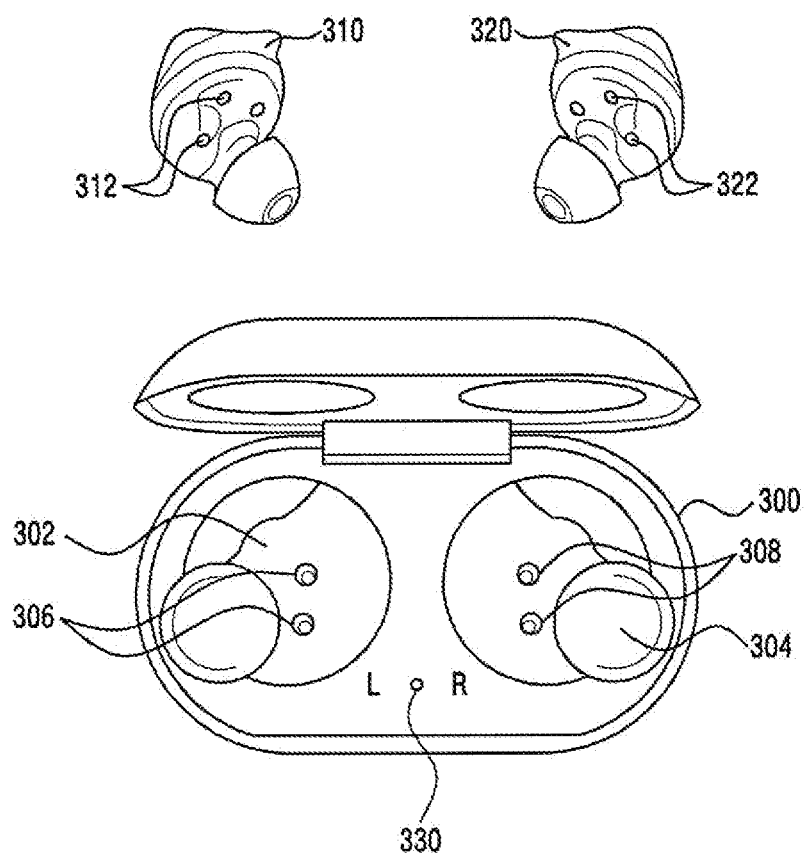
FIG. 3A illustrates an example of a cradle and a wireless communication device according to an embodiment.

FIG. 3A illustrates an example of a cradle and a wireless communication device according to an embodiment.

The cradle 300 may be a device that is electrically connected to a wireless communication device and performs functions such as supplying a battery to the wireless communication device or transmitting data. In the following description, the cradle may also be referred to as a charging cradle, a case, or a voltage supply device. The wireless communication devices 310 and 320 shown in FIG. 3 may correspond to the wireless communication device 200 of FIG. 2.

Referring to FIG. 3A, the cradle 300 may include a first receiving unit 302 to which the first wireless communication device 310 can be mounted, and a second receiving unit 304 to which the second wireless communication device 320 can be mounted. In an embodiment, a first connector 306 including at least one terminal may be disposed on a bottom surface of the first receiving unit 302. In an embodiment, a second connector 308 including at least one terminal may be disposed on a bottom surface of the second receiving unit 304.

In an embodiment, the first connector 306 and the second connector 308 may include pogo pins. In an embodiment, the first connector 306 and the second connector 308 may include at least one of a power supply terminal for charging, a ground (GND) terminal, a detection terminal, or a terminal for data communication. In an embodiment, the terminal of at least one of the first connector 306 and the second connector 308 may perform two or more functions. For example, the connectors 306 and 308 may implement the power supply terminal for charging, the detection terminal, and the terminal for data communication. For example, at least one terminal included in the first connector 306 may detect that the first wireless communication device 310 is mounted in the first receiving unit 302, may charge the first wireless communication device 310, and may perform data communication with the first wireless communication device 310.

In an embodiment, the cradle 300 may include an LED indicator 330. In an embodiment, the LED indicator 330 may output a signal when the first wireless communication device 310 or the second wireless communication device 320 is mounted in at least one of the first receiving unit 302 or the second receiving unit 304. For example, when the first wireless communication device 310 is mounted in the first receiving unit 302, a signal (e.g., green light or red light) indicating a charging state (e.g., completely charged or being currently charged) of the first wireless communication device 310 may be output. In an embodiment, the cradle 300 may include a plurality of LED indicators 330.

In an embodiment, the first wireless communication device 310 may receive a voltage from the cradle 300 through the connector 312. The connector 312 may include two terminals. In an embodiment, the second wireless communication device 320 may receive a voltage from the cradle 300 through the connector 322. The connector 322 may include two terminals. In an embodiment, the first wireless communication device 310 and the second wireless communication device 320 may transmit or receive data to or from the cradle 300 through the connector 312 and the connector 322, respectively. For example, the first wireless communication device 310 may transmit data including a battery state of charge (SOC) of the first wireless communication device to the cradle 300. In addition, for example, the first wireless communication device 310 may transmit a matching start signal between the first wireless communication device 310 and the second wireless communication device 320 to the cradle 300.

In an embodiment, the first wireless communication device 310 or the second wireless communication device 320 may use at least one terminal (e.g., the connector 312 or the connector 322) for charging the battery 260 and/or performing communication, and may perform power line communication using the at least one terminal.

Figure 3B:
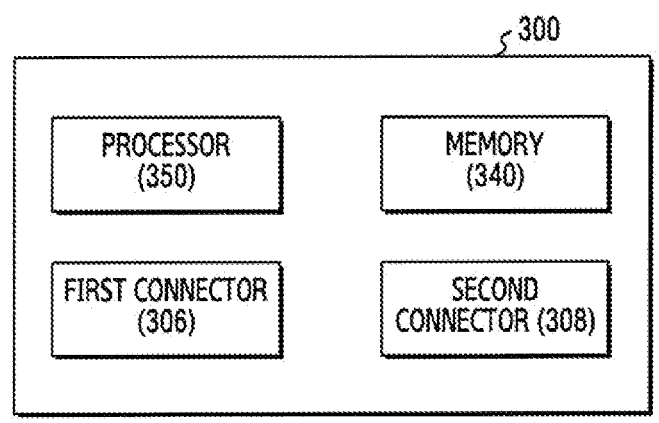
FIG. 3B is a block diagram illustrating a cradle 300 according to an embodiment.

FIG. 3B is a block diagram illustrating the cradle 300 according to an embodiment.

Referring to FIG. 3B, the cradle 300 may include a processor 350, a memory 340, a first connector 306, and a second connector 308.

In an embodiment, the first connector 306 may electrically connect the cradle 300 and the first wireless communication device 310. In an embodiment, the second connector 308 may form an electrical connection between the cradle 300 and the second wireless communication device 320.

In an embodiment, the cradle 300 may control the voltage of the cradle 300 using the processor 350. For example, the processor 350 may charge a battery (not shown) upon detecting that power is applied through an external power interface (not shown). In addition, for example, the processor 350 may control charging of the first wireless communication device 310 and the second wireless communication device 320. In addition, for example, the processor 350 may charge the first wireless communication device 310 and the second wireless communication device 320 upon detecting that power is applied from an external power supply device.

In an embodiment, data received from the first wireless communication device 310 and/or the second wireless communication device 320 may be stored in the memory 340.

In an embodiment, the processor 350 may transmit and receive data to and from the first wireless communication device 310 through the first connector 306. In an embodiment, the processor 350 may receive transmit and receive data to and from the second wireless communication device 320 through the second connector 308.

In an embodiment, the processor 350 may perform PLC or HPLC with the first wireless communication device 310 through the first connector 306. In an embodiment, the processor 350 may perform PLC or HPLC with the second wireless communication device 320 through the second connector 308.

In an embodiment, the processor 350 may detect whether the first wireless communication device 310 is mounted via the first connector 306, and may detect whether the second wireless communication device 320 is mounted via the second connector 308. For example, the processor 350 may detect whether the first wireless communication device 310 is mounted by detecting a change in a resistance value through the first connector 306. In addition, for example, the processor 350 may determine whether the first wireless communication device 310 is electrically connected to the cradle 300 through the first connector 306, using a sensor (not shown).

In an embodiment, the cradle 300 may control the voltage of the cradle 300 through the processor 350. For example, the processor 350 may charge a battery (not shown) upon detecting that power is applied through an external power interface (not shown). In addition, for example, the processor 350 may control charging of the first wireless communication device 310 and the second wireless communication device 320. In addition, for example, the processor 350 may charge the first wireless communication device 310 and the second wireless communication device 320 upon detecting that power is applied from an external power supply device.

Various embodiments of the disclosure relate to a device for performing effective power line communication between a wireless communication device and a cradle and an operating method thereof, in a wireless communication device (e.g., the first wireless communication device 310 or the second wireless communication device 320) such as true wireless stereo (TWS). In an embodiment, the wireless communication device (e.g., the first wireless communication device 310 or the second wireless communication device 320, or the electronic device 200 of FIG. 2D) may perform power line communication (PLC) using the connector 290. As to PLC, two-way communication (e.g., from the wireless communication device to the cradle and from the cradle to the wireless communication device) is possible. Since a voltage (e.g., 5V) used for PLC implemented in a TWS product is relatively high and a data transmission rate (e.g., 2.2 KB) is relatively slow, when a large amount of data such as firmware data of the cradle is transmitted, the transmission time may be lengthened. In order to improve this, high-speed power line communication (HPLC) may be used. A voltage (e.g., 1.8V) used for HPLC may be relatively low compared to general PLC, and a relatively fast data transmission rate (e.g., 40 KB) compared to PLC may be obtained. Accordingly, in the case of transmitting a large amount of data such as firmware data of the cradle, when HPLC is used, the transmission time may be shortened. As to PLC, two-way communication (e.g., from the wireless communication device to the cradle or from the cradle to the wireless communication device) may be possible, but data communication speed is lower than that of HPLC, and relatively larger amount of power is consumed. In comparison, as to HPLC, although one-way communication from the wireless communication device to the cradle is supported, a higher data communication speed may be obtained compared to PLC and relatively lower voltage may be consumed, so that HPLC may complement PLC.

In various embodiments of the disclosure, although one-way communication may be performed in HPLC, HPLC is not limited to one-way communication, and in an embodiment, HPLC may support two-way communication.

According to an embodiment, a modulation and demodulation block for receiving data through PLC may be included in the cradle, but may not be included in earbuds. Accordingly, HPLC may be used only when transmitting data from the TWS product to the cradle and there may exist cases where the TWS does not include a demodulation block for HPLC, so that it may be difficult to receive data from the cradle via HPLC.

According to various embodiments of the disclosure, by taking advantage of the fact that TWS products (e.g., a pair of earbuds) are paired, a two-way communication link can be established between the TWS products and the cradle, thereby improving the transmission rate of data on the cradle (e.g., firmware data). In addition, in the case of transmitting high-capacity data, data to be transmitted by each of the TWS products is divided in HPLC and transmitted to the cradle, thereby reducing the time required for data transmission.

Figure 4:
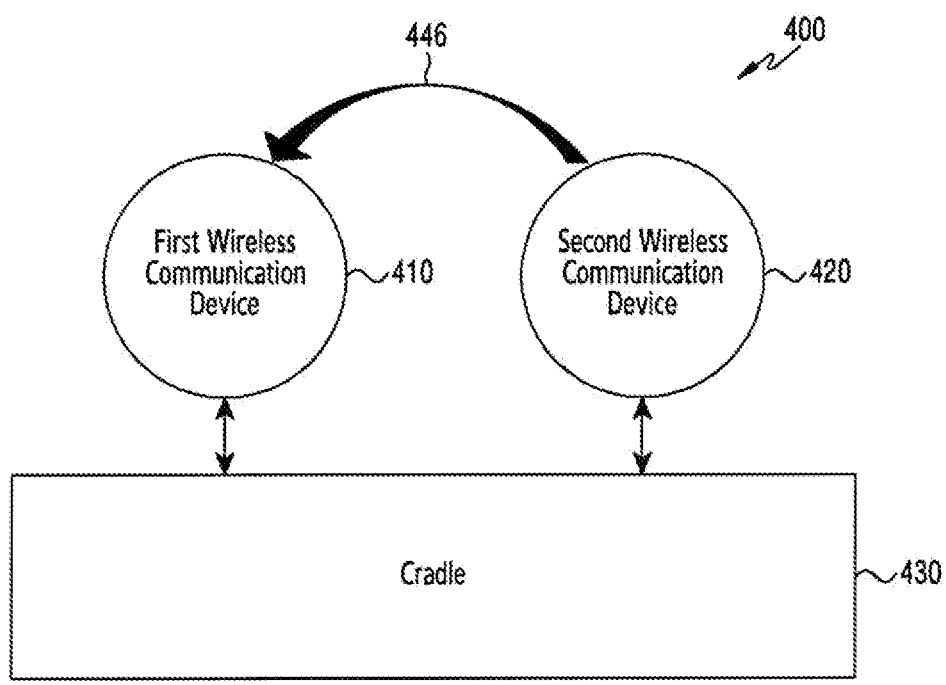
FIG. 4 illustrates an example of communication between a first wireless communication device, a second wireless communication device, and a cradle according to an embodiment of the disclosure.

FIG. 4 illustrates an example of communication between a first wireless communication device, a second wireless communication device, and a cradle according to an embodiment of the disclosure.

A first wireless communication device 410 of FIG. 4 may correspond to the wireless communication device 200 of FIG. 2 and the first wireless communication device 310 of FIG. 3A. A second wireless communication device 420 of FIG. 4 may correspond to the wireless communication device 200 of FIG. 2 and the second wireless communication device 320 of FIG. 3A. A cradle 430 of FIG. 4 may correspond the cradle 300 of FIGS. 3A and 3B.

In an embodiment, the first wireless communication device 410 and the second wireless communication device 420 may include a pair of TWS devices (e.g., a pair of earbuds).

In an embodiment, the first wireless communication device 410 may be a primary device, and the second wireless communication device 420 may be a secondary device.

In an embodiment, the first wireless communication device 410 may communicate with the electronic device 101 based on a short-range wireless communication technology (e.g., Bluetooth®, Bluetooth® low energy {BLE}).

In an embodiment, as seen in networked environment 400, the first wireless communication device 410 may communicate with the second wireless communication device 420 based on a short-range wireless communication technology. For example, the second wireless communication device 420 may transmit a short-range wireless communication signal 446 to the first wireless communication device 410. Although not shown in the drawings, the first wireless communication device 410 may also transmit a short-range wireless communication signal to the second wireless communication device 420. That is, the first wireless communication device 410 and the second wireless communication device 420 may transmit and receive the short-range wireless signal to and from each other.

In an embodiment, the first wireless communication device 410 may communicate with the cradle 430 based on a power line communication (PLC or HPLC) technology.

In an embodiment, the second wireless communication device 420 may communicate with the cradle 430 based on a power line communication (PLC) technology.

In an embodiment, a connector (e.g., the connector 290) included in each of the first wireless communication device 410 and the second wireless communication device 420 may be coupled to a connector (e.g., the first connector 306 or the second connector 308) of the cradle 430 so that the first wireless communication device 410 and the second wireless communication device 420 may be electrically connected to the cradle 430.

In an embodiment, when the first wireless communication device 410 and the second wireless communication device 420 are electrically connected to the cradle 430, power line communication may be performed.

In an embodiment, the first wireless communication device 410 may transmit data to the cradle 430 based on the HPLC technology. In an embodiment, the first wireless communication device 410 may receive data from the cradle 430 based on the PLC technology. In another embodiment, the first wireless communication device 410 may receive data from the cradle 430 based on the HPLC technology.

In an embodiment, the second wireless communication device 420 may transmit data to the cradle 430 based on the HPLC technology. In an embodiment, the second wireless communication device 420 may receive data from the cradle 430 based on the PLC technology. In another embodiment, the second wireless communication device 420 may receive data from the cradle 430 based on the HPLC technology.

In an embodiment, the cradle 430 may configure a voltage of the connector (e.g., the first connector 306 or the second connector 308) of the cradle 430 based on the particular communication technology (e.g., PLC or HPLC) to be used between the cradle 430 and the wireless communication devices. For example, when performing PLC with the wireless communication device coupled to the cradle 430, the cradle 430 may configure the voltage of the connector to be a first value (e.g., 1.8V). In an embodiment, when performing HPLC with the wireless communication device coupled to the cradle 430, the cradle 430 may configure the voltage of the connector to be a second value (e.g., 1.8V) smaller than the first value.

In an embodiment, the cradle 430 may control a switch (not shown) and a PMIC to perform PLC or HPLC. This will be described with reference to FIGS. 7 and 11, which will be described later.

Figure 5:
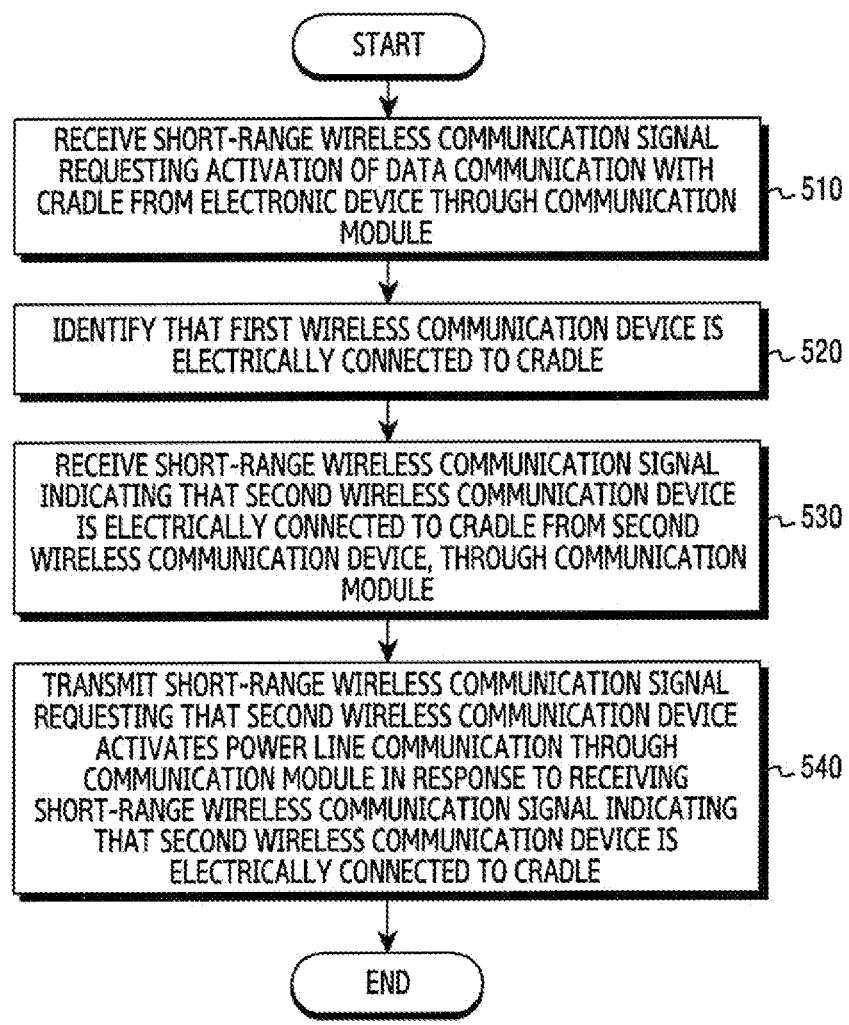
FIG. 5 is an operation flowchart illustrating a first wireless communication device according to an embodiment of the disclosure.

FIG. 5 is an operation flowchart illustrating a first wireless communication device according to an embodiment of the disclosure. The first wireless communication device of FIG. 5 may correspond to the first wireless communication device 410 of FIG. 4. The second wireless communication device of FIG. 5 may correspond to the second wireless communication device 420 of FIG. 4. The cradle of FIG. 5 may correspond to the cradle 430 of FIG. 4.

According to an embodiment, in operation 510, the first wireless communication device may receive a short-range wireless communication signal requesting activation of data communication with the cradle, from an electronic device, via a communication module.

In an embodiment, the short-range wireless communication signal requesting activation of data communication with the cradle received from the electronic device may be received based on Bluetooth® or Bluetooth® low energy technology.

In an embodiment, the short-range wireless communication signal requesting activation of data communication with the cradle, as received from the electronic device, may include data on the cradle. For example, the data on the cradle may include firmware data for updating the firmware of the cradle.

In an embodiment, the short-range wireless communication signal requesting activation of data communication with the cradle received from the electronic device may be transmitted through a wireless communication link established between the first wireless communication device and the electronic device. The wireless communication link may be established according to transmission and reception of a Bluetooth® connection request and a response signal between the first wireless communication device and the electronic device.

In an embodiment, in operation 520, the first wireless communication device may identify that the first wireless communication device is electrically connected to the cradle.

In an embodiment, the first wireless communication device may include a power management module (e.g., the power management circuit 270). The power management module may include a first power line communication block and a second power line communication block.

In an embodiment, the first wireless communication device may be electrically connected to the cradle through any one of a first power line communication block and a second power line communication block.

In an embodiment, the first power line communication block may be electrically connected to the cradle based on a first voltage, receive power from the cradle through the first power line communication block, and transmit the received power to the first wireless communication device. In an embodiment, the second power line communication block may be electrically connected to the cradle based on the second voltage. In an embodiment, the first voltage and the second voltage may be different from each other. For example, the first voltage may be 1.8V, and the second voltage may be 5V.

In an embodiment, the first wireless communication device may identify that the first wireless communication device is electrically connected to the cradle based on identifying that the resistance value of the first wireless communication device is changed.

In an embodiment, based on a data communication method (e.g., PLC or HPLC) between the first wireless communication device and the cradle, the first wireless communication device and the cradle may be electrically connected to each other. According to the data communication method of the first wireless communication device and the cradle, a connection state of a switch of the first wireless communication device and a connection state of a switch of the cradle may be changed.

According to an embodiment, in operation 530, the first wireless communication device may receive a short-range wireless communication signal indicating that the second wireless communication device is electrically connected to the cradle from the second wireless communication device through the communication module.

In an embodiment, the first wireless communication device may identify that the cradle is electrically connected to any one of the first power line communication block and the second power line communication block included in the power management module of the second wireless communication device.

In an embodiment, the first wireless communication device may perform power line communication with the cradle through two terminals (e.g., 312) included in the connector. In an embodiment, the second wireless communication device may perform power line communication with the cradle through two terminals (e.g., 322) included in the connector.

In an embodiment, power line communication may be performed through an HPLC method or a PLC method. In an embodiment, the HPLC method may not be performed together with charging of a battery of the wireless communication device (e.g., the first wireless communication device 410 or the second wireless communication device 420). In an embodiment, the PLC method may be performed together with charging of the battery of the wireless communication device.

In an embodiment, in response to receiving a short-range wireless communication signal indicating that the second wireless communication device is electrically connected to the cradle, in operation 540, the second wireless communication device may transmit the short-range wireless communication signal requesting activation of power line communication by the second wireless communication device, to the second wireless communication device.

In an embodiment, the short-range wireless communication signal requesting activation of power line communication by the second wireless communication device may include a signal requesting the second wireless communication device to enter a download mode.

In an embodiment, the short-range wireless communication signal requesting activation of power line communication by the second wireless communication device may be transmitted based on the Bluetooth® technology.

In an embodiment, the short-range wireless communication signal requesting the second wireless communication device to activate power line communication may include information on a power line communication method between the second wireless communication device and the cradle. For example, the power line communication method between the second wireless communication device and the cradle may include an HPLC method or a PLC method. Power line communication through the HPLC method may be performed through the first power line communication block, and power line communication through the PLC method may be performed through the second power line communication block.

In an embodiment, the short-range wireless communication signal requesting the second wireless communication device to activate power line communication may include a portion of data on the cradle. For example, when the first wireless communication device and the second wireless communication device divide the data on the cradle and transmit the divided data to the cradle, the short-range wireless communication signal requesting the second wireless communication device to activate power line communication may include a part of the data on the cradle.

In an embodiment, although not shown in the drawings, in response to receiving the short-range wireless communication signal indicating that the second wireless communication device is electrically connected to the cradle, the cradle may transmit a power line communication signal requesting the cradle to activate the power line communication, to the cradle. In an embodiment, the power line communication signal requesting the cradle to activate the power line communication may be transmitted through the PLC method or the HPLC method.

In an embodiment, the power line communication signal requesting the cradle to activate the power line communication may include information on a power line communication method between the cradle and the first wireless communication device. For example, the power line communication method between the cradle and the first wireless communication device may include HPLC or PLC.

In an embodiment, the first wireless communication device may transmit the power line communication signal including data on the cradle to the cradle. The data on the cradle may include data on firmware of the cradle.

In an embodiment, the first wireless communication device may transmit the power line communication signal including the data on the cradle based on the HPLC technology. The power line communication signal including the data on the cradle may be transmitted through the first power line communication block of the first wireless communication device.

In an embodiment, the power line communication signal including the data on the cradle may include all or part of the data on the cradle. For example, when the first wireless communication device transmits the data on the cradle to the cradle, the power line communication signal including the data on the cradle may include the entire data on the cradle. In addition, for example, when the first wireless communication device and the second wireless communication device divide data on the cradle and transmit the divided data to the cradle, the power line communication signal including the data on the cradle may include only a part of the data on the cradle.

In an embodiment, although not shown in the drawings, the first wireless communication device may receive a signal including information on whether the cradle successfully receives data on the cradle. For example, when the cradle successfully receives the data on the cradle, the first wireless communication device may receive a signal including an ACK from the cradle or the second wireless communication device. In addition, for example, when the cradle does not successfully receive the data on the cradle, the first wireless communication device may receive a signal including a NACK from the cradle or the second wireless communication device.

Figure 6:
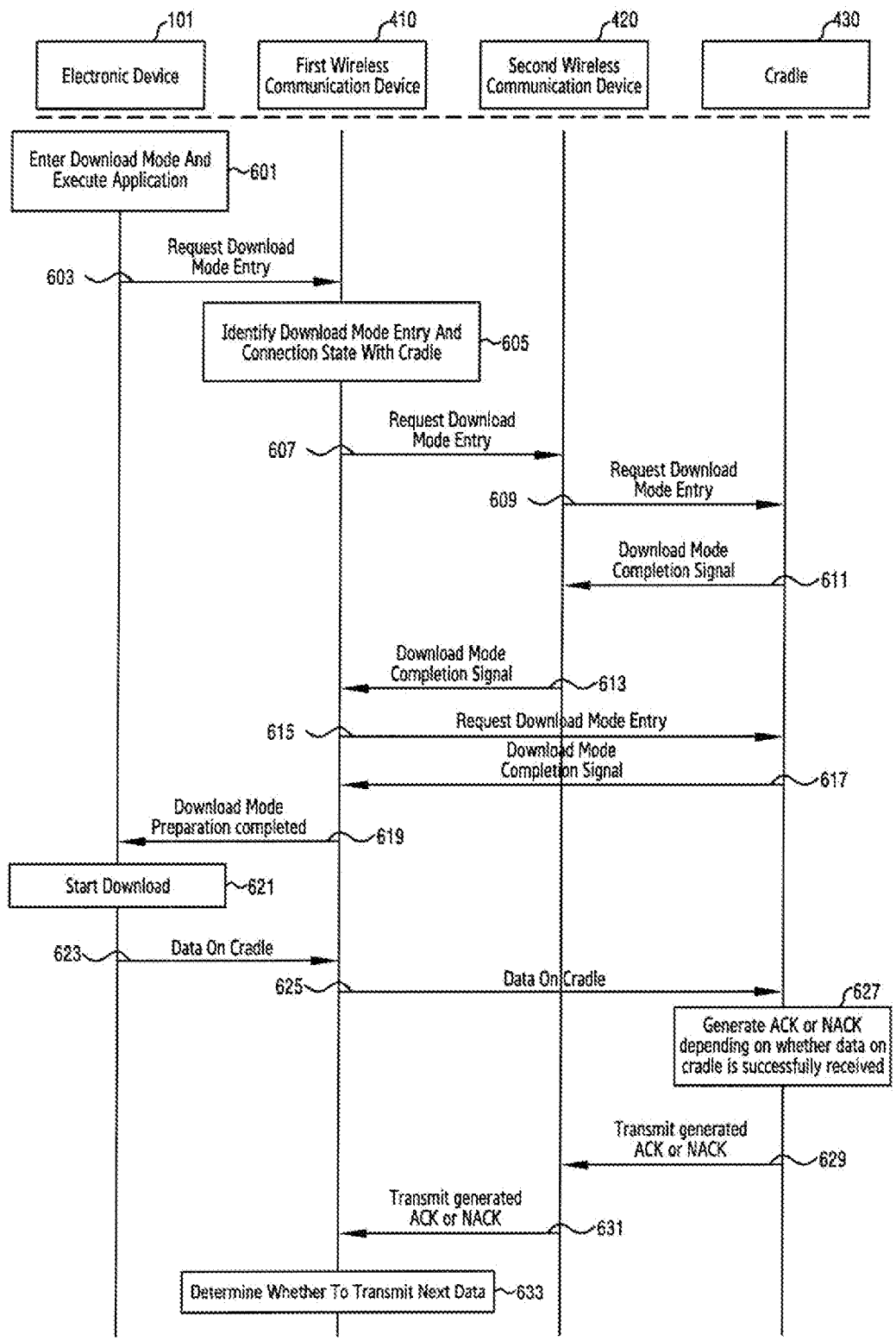
FIG. 6 illustrates an operation flowchart illustrating an electronic device, a first wireless communication device, a second wireless communication device, and a cradle according to an embodiment of the disclosure.

FIG. 6 illustrates an operation flowchart illustrating an electronic device, a first wireless communication device, a second wireless communication device, and a cradle according to an embodiment of the disclosure. In FIG. 6, operations of the electronic device 101, the first wireless communication device 410, the second wireless communication device 420, and the cradle 430 to download data on the cradle are illustrated. The first wireless communication device 410 may be a primary device, and the second wireless communication device 420 may be a secondary device. The first wireless communication device 410 may transmit data to the cradle 430, and the second wireless communication device 420 may receive data from the cradle 430 and may transmit the data received from the cradle 430 to the first wireless communication device 410.

In an embodiment, in operation 601, the electronic device 101 may enter a mode for downloading data on the cradle 430 through a display, and may execute an application for downloading the data on the cradle 430.

In an embodiment, the electronic device 101 may enter the mode for downloading the data on the cradle 430 and may execute the application for downloading the data on the cradle 430 based on identifying a user's input received through the display.

In an embodiment, the application may include an application for downloading firmware data of the cradle 430.

In an embodiment, the electronic device 101 may enter the download mode based on a user input identified through a user interface displayed when the application is executed.

In an embodiment, in operation 603, the electronic device 101 may transmit the data on the cradle 430 or a short-range wireless communication signal requesting the cradle 430 to enter the download mode to the first wireless communication device 410. The short-range wireless communication signal requesting the cradle 430 to enter the download mode transmitted in operation 603 may correspond to the short-range wireless communication signal requesting activation of data communication with the cradle in FIG. 5.

In an embodiment, the electronic device 101 may transmit the data on the cradle and the signal requesting the cradle 430 to enter the download mode, to the first wireless communication device 410 based on the short-range wireless communication technology (e.g., Bluetooth®, Bluetooth® low energy).

In an embodiment, the electronic device 101 may transmit a short-range wireless communication signal through a wireless communication link established between the first wireless communication device 410 and the electronic device 101.

In an embodiment, the data on the cradle may include data on a firmware update of the cradle 430.

In an embodiment, in operation 605, the first wireless communication device 410 may enter the download mode, and may confirm the connection state with the cradle 430. The operation of the first wireless communication device 410 according to operation 605 may include operations 520 and 530 of FIG. 5.

In an embodiment, the first wireless communication device 410 may enter the mode for downloading the data on the cradle in response to receiving a first Bluetooth® signal from the electronic device 101.

In an embodiment, the first wireless communication device 410 may identify whether the first wireless communication device 410 and the cradle 430 are electrically connected to each other and whether the second wireless communication device 420 and the cradle 430 are electrically connected to each other. For example, the first wireless communication device 410 may identify whether the connector (e.g., the connector 290) of the first wireless communication device 410 and the connector (e.g., the connector 306) of the cradle 430 are electrically connected to each other. In addition, the first wireless communication device 410 may identify whether the connector of the second wireless communication device 420 and the connector (e.g., the second connector 308) of the cradle 430 are electrically connected to each other.

In an embodiment, in operation 607, the first wireless communication device 410 may transmit a second short-range wireless communication signal requesting the second wireless communication device 420 to enter a download mode, to the second wireless communication device 420. The second short-range wireless communication signal requesting the second wireless communication device 420 to enter the download mode in operation 607 may include the short-range wireless communication signal requesting the second wireless communication device to activate power line communication in operation 540. The second short-range wireless communication signal may be transmitted based on Bluetooth® or the Bluetooth® low energy technology.

In an embodiment, a second Bluetooth® signal may include information on a power line communication method between the second wireless communication device 420 and the cradle 430. For example, the second Bluetooth® signal may include information instructing the second wireless communication device 420 to communicate data to the cradle 430 through PLC.

In an embodiment, in operation 609, the second wireless communication device 420 may transmit a power line communication signal requesting the cradle 430 to enter a download mode. The signal requesting the cradle 430 to enter the download mode may be transmitted based on the PLC technology.

In an embodiment, the signal requesting the cradle 430 to enter the download mode may include information indicating a communication method between the second wireless communication device 420 and the cradle 430. For example, the signal requesting the cradle 430 to enter the download mode may include information instructing the second wireless communication device 420 to receive the signal from the cradle 430 through PLC.

In an embodiment, the cradle 430 may enter the download mode in response to receiving the signal requesting the cradle 430 to enter the download mode.

In an embodiment, the cradle 430 may configure the voltage of the connector (e.g., the second connector 308) of the cradle 430 to correspond to the information in response to receiving the information indicating the communication method between the second wireless communication device 420 and the cradle 430. For example, when receiving the information instructing to receive the signal through PLC from the second wireless communication device 420, the cradle 430 may configure the voltage of the connector (e.g., the second connector 308) to be 5V.

In an embodiment, the cradle 430 may configure a clock rate of the cradle 430 in response to receiving the information indicating the communication method between the second wireless communication device 420 and the cradle 430.

In an embodiment, the cradle 430 may determine a sensing method in response to receiving the information indicating the communication method between the second wireless communication device 420 and the cradle 430. For example, when the cradle 430 receives the information instructing to receive the signal from the second wireless communication device 420 through PLC, the sensing method may be determined to be a current sensing method in the case of the cradle 430, and may be determined to be a voltage sensing method in the case of the second wireless communication device 420. In addition, for example, when the cradle 430 receives information indicating to receive the signal through HPLC from the second wireless communication device 420, the sensing method of the cradle 430 may be determined to be the voltage sensing method.

In an embodiment, in operation 611, the cradle 430 may transmit a download mode-entry completion signal to the second wireless communication device 420. In an embodiment, the cradle 430 may transmit the download mode-entry completion signal to the second wireless communication device 420 based on PLC.

In an embodiment, in operation 613, the second wireless communication device 420 may transmit the download mode-entry completion signal of the second wireless communication device 420 to the first wireless communication device 410, in response to receiving the download mode-entry completion signal from the cradle 430. In an embodiment, the download mode-entry completion signal of the second wireless communication device 420 may include an ACK.

According to an embodiment, in operation 615, the first wireless communication device 410 may transmit a first power line communication signal requesting the cradle 430 to enter the download mode. The first power line communication signal requesting the cradle to enter the download mode in operation 615 may include the power line communication signal requesting the cradle to activate power line communication disclosed in the description with respect to FIG. 5.

In an embodiment, the first power line communication signal may be transmitted based on the PLC technology.

In an embodiment, the first power line communication signal may include information indicating a method in which the cradle 430 receives data from the first wireless communication device 410. For example, the first power line communication signal may include the information instructing the cradle 430 to receive data from the first wireless communication device 410 via HPLC.

In an embodiment, the cradle 430 may enter the download mode in response to receiving the first power line communication signal from the first wireless communication device 410.

In an embodiment, in response to receiving the first power line communication signal from the first wireless communication device 410, the cradle 430 may change the voltage of the connector (e.g., the first connector 306) included in the cradle 430 to receive data through HPLC. For example, when receiving the first power line communication signal and receiving data from the first wireless communication device 410 through HPLC, the cradle 430 may configure a voltage of a pogo pin electrically connected to the first wireless communication device 410 to be 1.8V.

In an embodiment, the cradle 430 may configure a clock of the cradle 430 in response to receiving the information indicating the communication method between the second wireless communication device 420 and the cradle 430.

In an embodiment, the cradle 430 may determine the sensing method in response to receiving the information indicating the communication method between the first wireless communication device 410 and the cradle 430. For example, when the cradle 430 receives information instructing to receive a signal from the first wireless communication device 410 through HPLC, the sensing method of the cradle 430 may be determined to be the voltage sensing method.

According to an embodiment, in operation 617, the cradle 430 may transmit the download mode-entry completion signal to the first wireless communication device 410. In an embodiment, the cradle 430 may transmit the download mode-entry completion signal based on PLC.

According to an embodiment, in operation 619, the first wireless communication device 410 may transmit a short-range wireless communication signal indicating that data download preparation for the cradle is completed, to the electronic device 101.

In an embodiment, the cradle 430 has been described as receiving a download mode-entry request from both the first wireless communication device 410 and the second wireless communication device 420 (operations 609 and 615), but the cradle 430 may receive the download mode-entry request from only one of the first wireless communication device 410 or the second wireless communication device 420. For example, when the cradle 430 receives the download mode-entry request from the second wireless communication device 410 in operation 609, the cradle 430 may not receive the download mode-entry request from the first wireless communication device 410.

In an embodiment, in operation 621, the electronic device 101 may initiate an operation for download when receiving the short-range wireless communication signal informing that the data download preparation for the cradle is completed from the first wireless communication device 410, as per step 619.

In an embodiment, in operation 623, the electronic device 101 may transmit a short-range wireless communication signal including the data on the cradle to the first wireless communication device 410.

According to an embodiment, in operation 625, the first wireless communication device 410 may transmit the second power line communication signal including the data on the cradle to the cradle 430 in response to receiving the short-range wireless communication signal including the data on the cradle from the electronic device 101. In an embodiment, the first wireless communication device 410 may transmit the second power line communication signal based on the HPLC technology.

According to an embodiment, in operation 627, the cradle 430 may determine whether the data on the cradle received from the first wireless communication device 410 has been successfully received, and may generate a signal including ACK or NACK. In an embodiment, when the cradle 430 successfully receives the data, a signal including an ACK may be generated. In an embodiment, when the cradle 430 does not successfully receive the data, a signal including a NACK may be generated.

In an embodiment, the cradle 430 may determine whether the cradle 430 successfully receives the data on the cradle through cyclic redundancy check (CRC).

According to an embodiment, in operation 629, the cradle 430 may transmit the signal generated in operation 627 to the second wireless communication device 420 based on the PLC technology.

In an embodiment, while the cradle 430 receives the data on the cradle, information on the download status (e.g., download progress) of the data on the cradle may be transmitted to the second wireless communication device 420.

In an embodiment, when an event such as a change in the charging situation, an external shock, or insufficient battery power occurs, the cradle 430 may transmit the event to the second wireless communication device 420.

According to an embodiment, in operation 631, the second wireless communication device 420 may transmit a signal including ACK or NACK included in the signal received from the cradle in operation 629 to the first wireless communication device 410.

According to an embodiment, in operation 633, the first wireless communication device 410 may transmit the data on the cradle to the cradle or may retransmit the previously transmitted data on the cradle based on the information (e.g., ACK or NACK) on whether the cradle successfully receives the data from the second wireless communication device 420.

In an embodiment, when the first wireless communication device 410 receives the NACK from the second wireless communication device 420, the first wireless communication device 410 may retransmit the data on the cradle that has been previously transmitted to the second wireless communication device 420. In an embodiment, when the first wireless communication device 410 receives the ACK from the second wireless communication device 420, the first wireless communication device 410 may transmit another data other than the data on the cradle that has been previously transmitted to the second wireless communication device 420.

Figure 7:
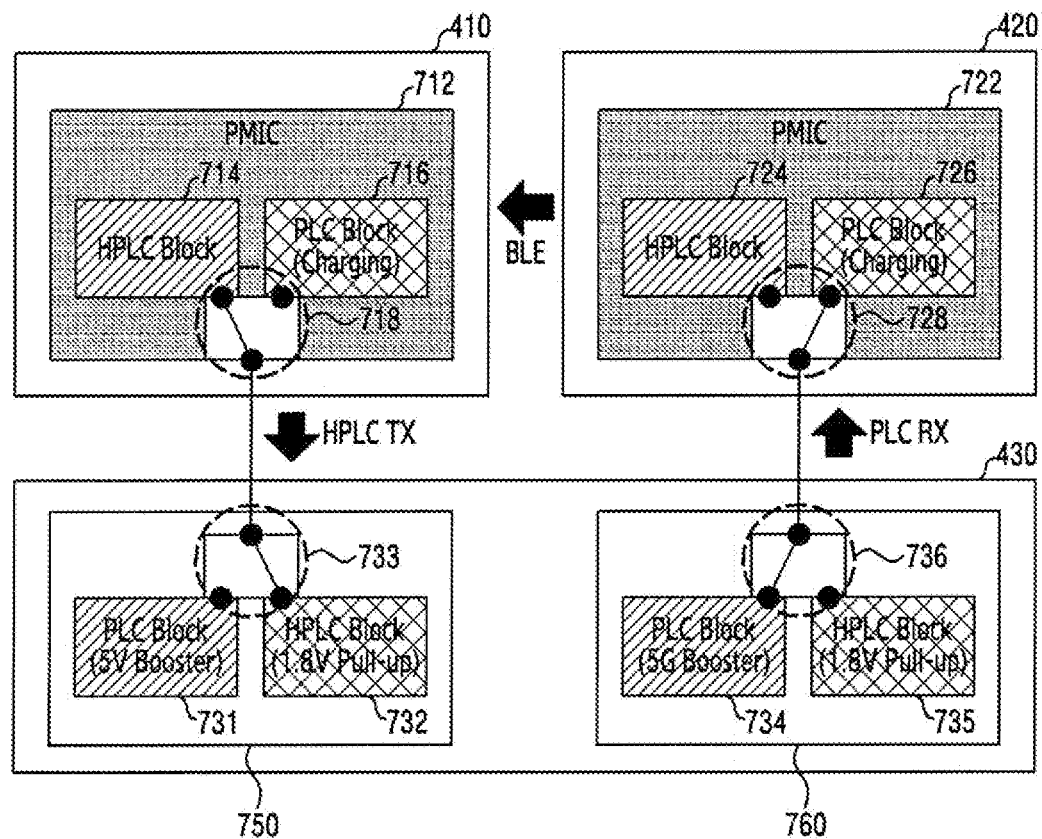
FIG. 7 illustrates the configuration of a first wireless communication device, a second wireless communication device, and a cradle according to an embodiment of the disclosure.

FIG. 7 illustrates the configuration of the first wireless communication device 410, the second wireless communication device 420, and a cradle according to an embodiment of the disclosure. The electronic device of FIG. 7 may correspond to the electronic device 101 of FIG. 1. The first wireless communication device 410 of FIG. 7 may correspond to the first wireless communication device 410 of FIG. 4. The second wireless communication device 420 of FIG. 7 may correspond to the second wireless communication device 420 of FIG. 4. The cradle of FIG. 7 may correspond to the cradle 430 of FIG. 4. Referring to FIG. 7, a data transmission path and a data reception path between the first wireless communication device 410, the second wireless communication device 420, and the cradle are illustrated. The connection between the first wireless communication device 410, the second wireless communication device 420, and the cradle 430 according to FIG. 7 may be understood as an example of a connection structure when the operations of the first wireless communication device 410, the second wireless communication device 420, and the cradle 430 described in FIG. 6 are performed.

In an embodiment, the first wireless communication device 410 may include a PMIC 712. The PMIC 712 may include an HPLC block 714, a PLC block 716, and a switch 718.

In an embodiment, the second wireless communication device 420 may include a PMIC 722. The PMIC 722 may include an HPLC block 724, a PLC block 726, and a switch 728.

In an embodiment, the cradle 430 may include a PMIC 750 and a PMIC 760. The PMIC 750 may include a PLC block 731, an HPLC block 732, and a switch 733. The PMIC 760 may include a PLC block 734, an HPLC block 735, and a switch 736.

In an embodiment, the PMIC 712 of the first wireless communication device 410 may be electrically connected to the PMIC 750 of the cradle 430. The first wireless communication device 410 may transmit data to the cradle 430 through HPLC.

In an embodiment, when the first wireless communication device 410 transmits data to the cradle 430 via HPLC, the switch 718 may be connected to the HPLC block 714 of the PMIC 712, and the switch 733 of the cradle 430 may be connected to the HPLC block 732.

In an embodiment, the PMIC 722 of the second wireless communication device 420 may be electrically connected to the PMIC 760 of the cradle 430. The second wireless communication device 420 may receive data from the cradle 430 through PLC.

In an embodiment, when the second wireless communication device 420 receives data from the cradle 430 through PLC, the switch 728 may be connected to the PLC block 726 of the PMIC 722, and the switch 736 of the cradle 430 may be connected to the PLC block 734.

In an embodiment, the first wireless communication device 410 may receive a short-range wireless communication signal from the second wireless communication device 420. The short-range wireless communication signal may be transmitted based on Bluetooth® or the Bluetooth® low energy technology.

In an embodiment, the second wireless communication device 420 may transmit a signal (e.g., a signal according to operations 611 and 629) received from the cradle 430 based on the Bluetooth® signal to the first wireless communication device 410.

Figure 8:
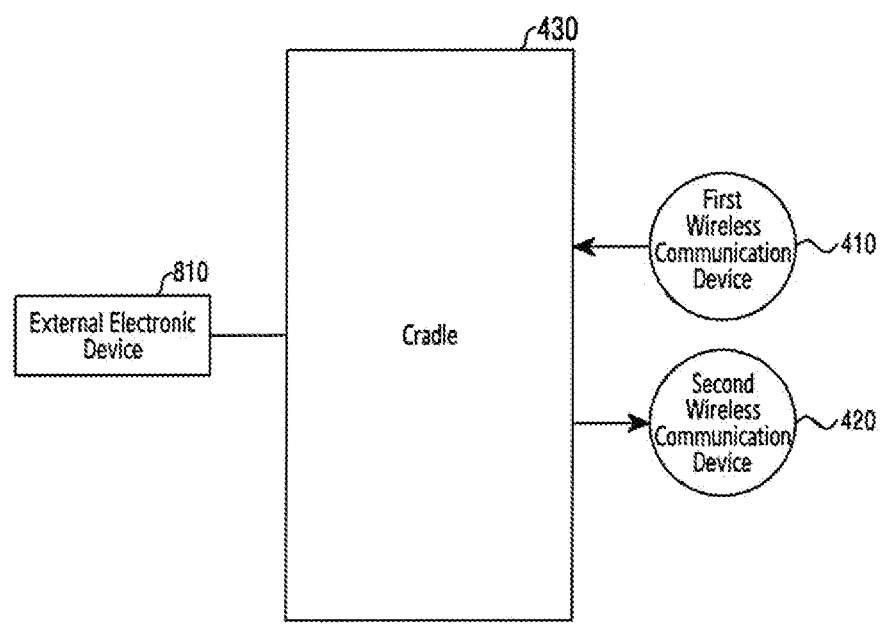
FIG. 8 illustrates an example of a processing process according to an embodiment of the disclosure.

FIG. 8 illustrates an example of a processing process according to an embodiment of the disclosure.

Referring to FIG. 8, the first wireless communication device 410, the second wireless communication device 420, the cradle 430, and an external electronic device 810 are shown.

In an embodiment, the external electronic device 810 may be a device used in a product manufacturing process.

In an embodiment, the first wireless communication device 410 may be a primary device, and may operate in HPLC to transmit data to the cradle.

In an embodiment, the second wireless communication device 420 may be a secondary device and may operate in PLC to receive data from the cradle.

In an embodiment, the external electronic device 810 may transmit a wireless communication device control command to the cradle 430. For example, the external electronic device 810 may transmit information related to the wireless communication device control command to the cradle 430 through a wired connection (e.g., USB type C, universal asynchronous receiver/transmitter {UART}).

In an embodiment, the cradle 430 may transmit the wireless communication device control command to the second wireless communication device 420 through PLC.

In an embodiment, the second wireless communication device 420 may transmit the wireless communication device control command to the first wireless communication device 410 through a Bluetooth® signal.

In an embodiment, the first wireless communication device 410 may transmit data corresponding to the wireless communication device control command to the cradle 430 through HPLC in response to receiving the wireless communication device control command from the second wireless communication device 420.

Operations of the first wireless communication device 410, the second wireless communication device 420, the cradle 430, and the electronic device 101 described below are the first wireless communication device 410 and the second wireless communication device 420 may all relate to a method of improving the transmission rate of the data on the cradle by transmitting data to the cradle 430 via HPLC.

Figure 9:
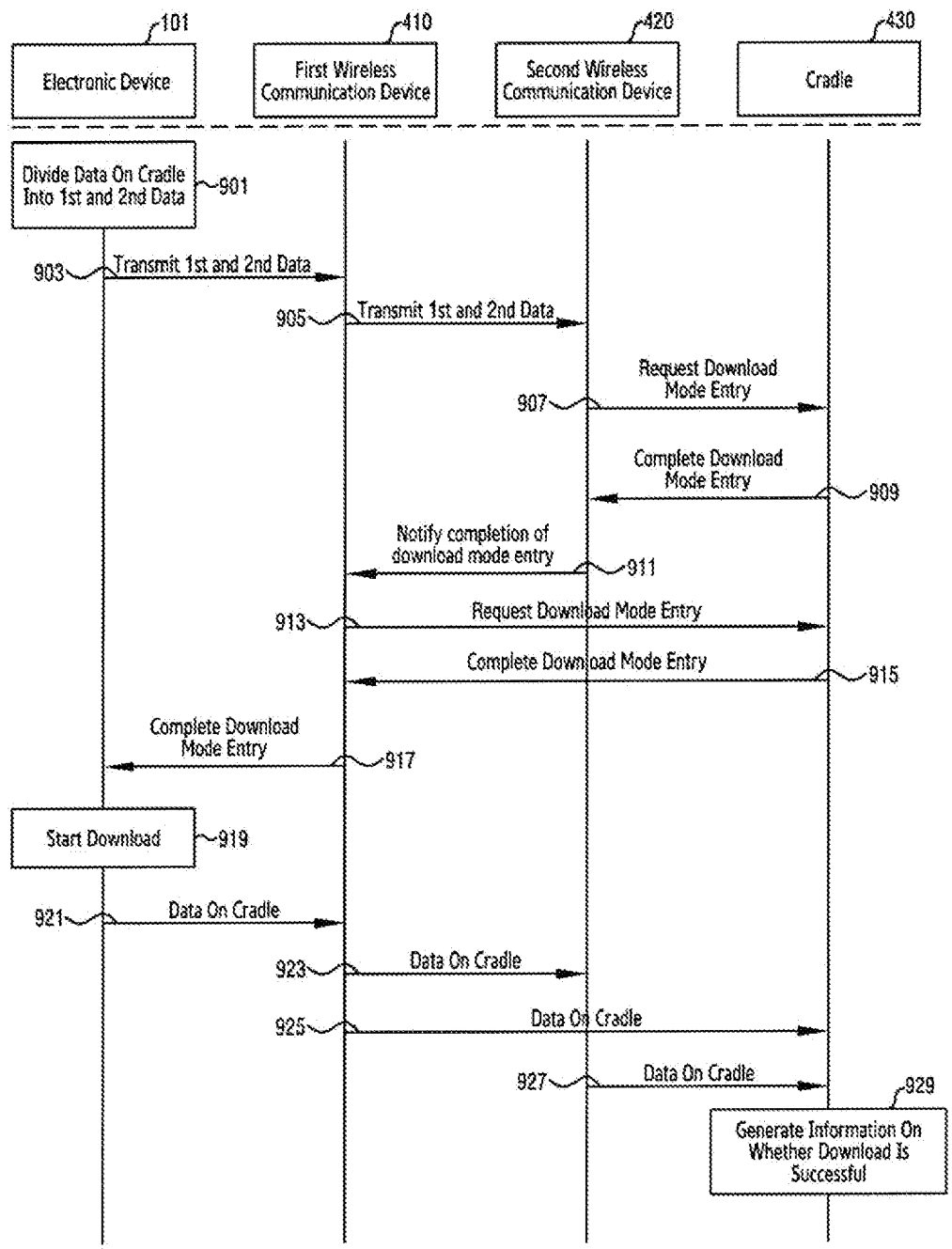
FIG. 9 is an operation flowchart illustrating an electronic device, a first wireless communication device, a second wireless communication device, and a cradle according to an embodiment of the disclosure.

FIG. 9 is an operation flowchart illustrating an electronic device, a first wireless communication device, a second wireless communication device, and a cradle according to an embodiment of the disclosure. FIG. 9 relates to operations of the electronic device 101, the first wireless communication device 410, the second wireless communication device 420, and the cradle 430 for faster downloading data on the cradle. The first wireless communication device 410 may be a primary device, and the second wireless communication device 420 may be a secondary device. The first wireless communication device 410 and the second wireless communication device 420 may transmit data to the cradle 430.

According to an embodiment, in operation 901, the electronic device 101 may divide the data on the cradle into first data and second data.

According to an embodiment, in operation 903, the electronic device 101 may transmit the data on the cradle including the first data and the second data to the first wireless communication device 410.

In an embodiment, the electronic device 101 may transmit a short-range wireless communication signal including the first data and the second data to the first wireless communication device 410.

According to an embodiment, in operation 905, the first wireless communication device 410 may transmit the data on the cradle to the second wireless communication device 420.

In an embodiment, the first wireless communication device 410 may transmit only the first data from the data on the cradle to the second wireless communication device 420. In an embodiment, the first wireless communication device 410 may transmit only the second data from the data on the cradle to the second wireless communication device. In an embodiment, the first wireless communication device 410 may transmit the data on the cradle including both the first data and the second data to the second wireless communication device 420.

In an embodiment, the first wireless communication device 410 may transmit the data on the cradle to the second wireless communication device 420 based on a short-range wireless communication technology (e.g., Bluetooth® or Bluetooth® low energy).

According to an embodiment, in operation 907, the second wireless communication device 420 may transmit a power line communication signal requesting the cradle to enter a download mode. In an embodiment, the second wireless communication device 420 may transmit the power line communication signal requesting the cradle to enter the download mode based on PLC.

In an embodiment, the power line communication signal requesting the cradle 430 to enter the download mode may include information instructing the cradle 430 to receive data from the second wireless communication device 420 through HPLC.

In an embodiment, the cradle 430 may enter the download mode in response to receiving the power line communication signal requesting the cradle to enter the download mode from the second wireless communication device 420.

In an embodiment, the cradle 430 may operate in HPLC in response to receiving the information instructing to receive data from the second wireless communication device 420 via HPLC, from the second wireless communication device 420. For example, the cradle 430 may receive data from the second wireless communication device based on HPLC, and for this purpose, a voltage (e.g., 1.8V) of a connector (e.g., the second connector 308) of the cradle 430 may be configured.

According to an embodiment, in operation 909, the cradle 430 may transmit a power line communication signal informing that the download mode entry is completed to the second wireless communication device 420. In an embodiment, the cradle 430 may transmit the power line communication signal informing that the download mode entry is completed to the second wireless communication device 420 based on PLC.

According to an embodiment, in operation 911, in response to receiving the power line communication signal informing that the download mode entry is completed from the cradle 430, the second wireless communication device 420 may transmit a short-range wireless communication signal informing that the download mode entry is completed to the first wireless communication device.

According to an embodiment, in operation 913, the first wireless communication device 410 may transmit the power line communication signal requesting the cradle 430 to enter the download mode. In an embodiment, the first wireless communication device 410 may transmit the power line communication signal requesting the cradle to enter the download mode based on PLC.

In an embodiment, the power line communication signal requesting the cradle 430 to enter the download mode may include information instructing the cradle 430 to receive data from the first wireless communication device 410 through HPLC.

In an embodiment, the cradle 430 may enter the download mode in response to receiving the power line communication signal requesting the cradle 430 to enter the download mode from the first wireless communication device 410.

In an embodiment, the cradle 430 may operate in HPLC from the first wireless communication device 410 in response to receiving the power line communication signal requesting the cradle 430 to enter the download mode from the first wireless communication device 410. For example, the cradle 430 may receive data from the first wireless communication device 410 based on HPLC, and for this purpose, the voltage (e.g., 1.8V) of the connector (e.g., the first connector 306) of the cradle 430 may be configured.

According to an embodiment, in operation 915, the cradle 430 may transmit the power line communication signal informing that the download mode entry has been completed to the first wireless communication device 410. In an embodiment, the cradle 430 may transmit the power line communication signal informing that the download mode entry has been completed to the first wireless communication device 410 based on PLC.

According to an embodiment, in operation 917, the first wireless communication device 410 may transmit a short-range wireless communication signal informing that a preparation for downloading the data on the cradle is completed, to the electronic device 101.

According to an embodiment, in operation 919, the electronic device 101 may execute an application for downloading the data on the cradle in response to receiving the short-range wireless communication signal informing that the preparation for downloading the data on the cradle is completed from the first wireless communication device 410.

According to an embodiment, in operation 921, the electronic device 101 may transmit a short-range wireless communication signal including the data on the cradle to the first wireless communication device 410.

According to an embodiment, in operation 923, the first wireless communication device 410 may transmit a short-range wireless communication signal informing a download start to the second wireless communication device 420.

According to an embodiment, in operation 925, the first wireless communication device 410 may transmit a power line communication signal including all or a part of the data on the cradle received from the electronic device 101 to the cradle 430. The first wireless communication device 410 may transmit the power line communication signal including all or a part of the data on the cradle to the cradle 430 through HPLC.

According to an embodiment, in operation 927, the second wireless communication device 420 may transmit the power line communication signal including all or a part of the data on the cradle received from the first wireless communication device 410 to the cradle 430. The second wireless communication device 420 may transmit the power line communication signal including all or a part of the data on the cradle to the cradle 430 through HPLC.

In an embodiment, the first wireless communication device 410 may transmit the first data of the data on the cradle to the cradle 430, and the second wireless communication device 420 may transmit the second data of the data on the cradle to the cradle 430. In this case, the first wireless communication device 410 and the second wireless communication device 420 divide and transmit data to be transmitted to the cradle, thereby reducing the time required for data transmission.

In an embodiment, the first wireless communication device 410 and the second wireless communication device 420 may transmit the data on the cradle including both the first data and the second data to the cradle 430. In this case, the cradle 430 has an effect of enabling more accurate data reception by receiving the same data from the first wireless communication device 410 and the second wireless communication device 420.

According to an embodiment, in operation 929, the cradle 430 may determine whether the data on the cradle has been successfully received.

In an embodiment, when the first wireless communication device 410 transmits the first data of the data on the cradle to the cradle 430 and the second wireless communication device 420 transmits the second data of the data on the cradle to the cradle 430, whether the data received from each wireless communication device has been successfully received may be determined. Next, a signal including an ACK may be generated when the data has been successfully received and a signal including a NACK may be generated when the data has not been successfully received, and the generated signal may be transmitted to each of the wireless communication devices.

In an embodiment, when the first wireless communication device 410 and the second wireless communication device 420 transmit the data on the cradle including both the first data and the second data to the cradle 430, whether data received from the first wireless communication device 410 and data received from the second wireless communication device 420 coincide with each other may be identified, and whether the data has been successfully received may be determined. For example, when the data received from the first wireless communication device 410 and the data received from the second wireless communication device 420 are the same, it may be determined that the data has been successfully received, and a signal including an ACK may be generated. In addition, for example, when the data received from the first wireless communication device 410 and the data received from the second wireless communication device 420 are not the same, it may be determined that the data has not been successfully received, and a signal including a NACK may be generated.

In an embodiment, the cradle 430 may transmit the signal including the ACK or NACK generated in operation 929 to the first wireless communication device 410 and the second wireless communication device 420.

Figure 10:
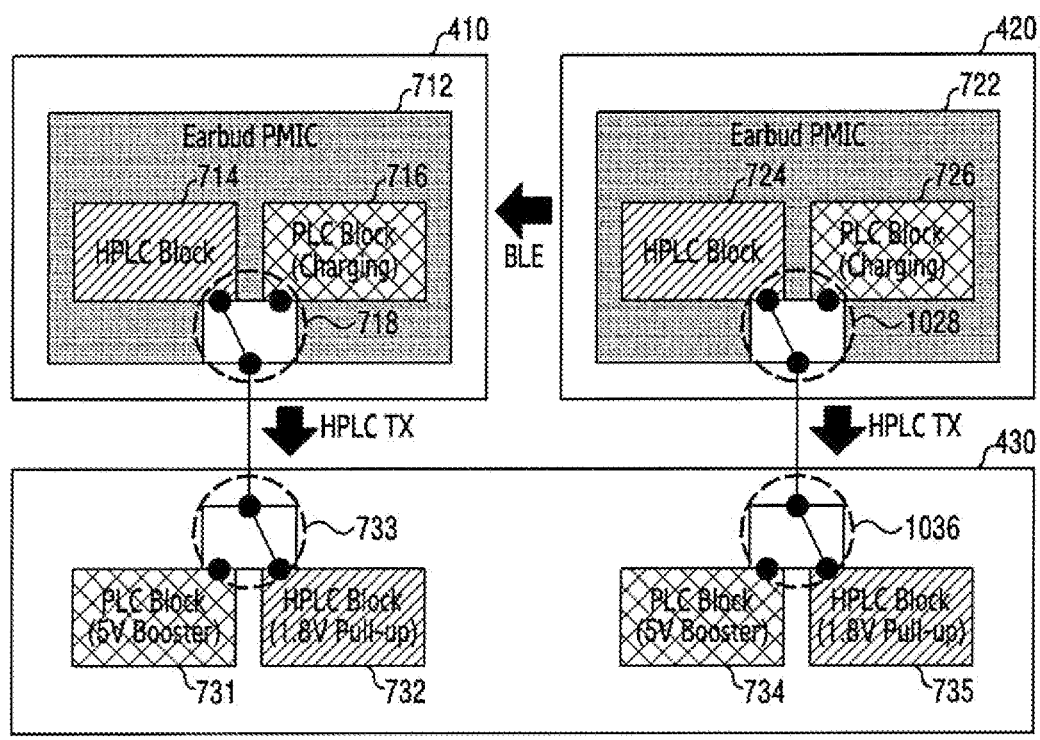
FIG. 10 illustrates the configuration of a first wireless communication device 410, a second wireless communication device 420, and a cradle according to an embodiment of the disclosure.

FIG. 10 illustrates the configuration of the first wireless communication device 410, the second wireless communication device 420, and a cradle according to an embodiment of the disclosure. Referring to FIG. 10, a data transmission path and a data reception path among the first wireless communication device 410, the second wireless communication device 420, and the cradle are illustrated. The connection of the first wireless communication device 410, the second wireless communication device 420, and the cradle 430 according to FIG. 10 may be understood as an example of the connection structure when the operations of the first wireless communication device 410, the second wireless communication device 420, and the cradle 430 which have been described in FIG. 9 are performed.

In an embodiment, the first wireless communication device 410 may include a PMIC 712. The PMIC 712 may include an HPLC block 714, a PLC block 716, and a switch 718.

In an embodiment, the second wireless communication device 420 may include a PMIC 722. The PMIC 722 may include an HPLC block 724, a PLC block 726, and a switch 1028.

In an embodiment, the cradle 430 may include a PMIC 750 and a PMIC 760. The PMIC 750 may include a PLC block 731, an HPLC block 732, and a switch 733. The PMIC 760 may include a PLC block 734, an HPLC block 735, and a switch 1036.

In an embodiment, the PMIC 712 of the first wireless communication device 410 may be electrically connected to the PMIC 750 of the cradle 430. The first wireless communication device 410 may transmit data to the cradle 430 through HPLC.

In an embodiment, when the first wireless communication device 410 transmits data to the cradle 430 through HPLC, the switch 718 may be coupled to the HPLC block 714 of the PMIC 712 and the switch 733 of the cradle 430 may be connected to the HPLC block 732.

In an embodiment, the PMIC 722 of the second wireless communication device 420 may be electrically connected to the PMIC 760 of the cradle 430. The second wireless communication device 420 may transmit data from the cradle 430 via HPLC.

In an embodiment, when the second wireless communication device 420 transmits data to the cradle 430 via HPLC, the switch 728 may be connected to the HPLC block 724 of the PMIC 722, and the switch 1036 of the cradle 430 may be connected to the HPLC block 735.

In an embodiment, the first wireless communication device 410 may receive a short-range wireless communication signal from the second wireless communication device 420. The short-range wireless communication signal may be transmitted based on Bluetooth® or Bluetooth® low energy technology.

In an embodiment, the second wireless communication device 420 may transmit a signal (e.g., a signal according to operations 905, 911, and 923) received from the cradle 430 based on a Bluetooth® signal, to the first wireless communication device 410.

A first wireless communication device according to an embodiment of the disclosure may include a power management module for an electrical connection with a cradle and power line communication, a communication module for wireless communication with an electronic device and a second wireless communication device, and at least one processor configured to be electrically connected to the communication module and the power management module, wherein the at least one processor may be configured to receive a short-range wireless communication signal requesting activation of data communication with the cradle from the electronic device through the communication module, to identify that the first wireless communication device is electrically connected to the cradle, to receive a short-range wireless communication signal indicating that the second wireless communication device is electrically connected to the cradle from the second wireless communication device through the communication module, and to transmit a short-range wireless communication signal requesting the second wireless communication device to activate power line communication through the communication module to the second wireless communication device in response to the reception of the short-range wireless communication signal indicating that the second wireless communication device is electrically connected to the cradle.

In an embodiment, the power management module may include a first power line communication block and a second power line communication block, the first wireless communication device may be electrically connected to the cradle through one of the first power line communication block or the second power line communication block, the first power line communication block may be electrically connected to the cradle based on a first voltage and may receive power from the cradle, the second power line communication block may be electrically connected to the cradle based on a second voltage, and the first voltage may be different from the second voltage.

In an embodiment, the at least one processor may be configured to transmit a power line communication signal including data on firmware of the cradle to the cradle through the second power line communication block, and a power line communication signal requesting the cradle to activate power line communication is transmitted through the first power line communication block.

In an embodiment, the short-range wireless communication signal requesting the second wireless communication device to activate power line communication may include data related to a power line communication operation of the second wireless communication device, and the data related to the power line communication operation of the second wireless communication device may include one of data instructing the second wireless communication device to transmit a power line communication signal to the cradle or data instructing the second wireless communication device to receive a power line communication signal from the cradle.

In an embodiment, the at least one processor may be configured to receive, from the second wireless communication device, a short-range wireless communication signal including information on whether the cradle successfully receives the data on the firmware of the cradle.

In an embodiment, when a NACK is included in the information on whether the cradle successfully receives the data on the cradle, the power line communication signal including the data on the firmware of the cradle may be retransmitted to the cradle through the second power line communication block.

In an embodiment, the short-range wireless communication signal including the information on whether the cradle successfully receives the data on the firmware of the cradle from the second wireless communication device may include at least one of information indicating a download status of the data on the cradle, information on a charging state of the cradle, and information identified through a sensor of the cradle.

In an embodiment, when the data related to the power line communication operation of the second wireless communication device includes the data instructing the second wireless communication device to transmit the power line communication signal from the cradle, the at least one processor may be configured to transmit only a first portion of the data on the firmware of the cradle to the cradle, and to transmit the remaining portion except for the first portion from the data on the cradle to the cradle through the second wireless communication device.

In an embodiment, the at least one processor may be configured to identify a change in a resistance value measured through the power management module to identify that the first wireless communication device is electrically connected to the cradle.

In an embodiment, the at least one processor may transmit the short-range wireless communication signal including the information indicating a download status of the data on the cradle to the electronic device.

A cradle according to an embodiment of the disclosure may include a first connector configured to be electrically connected to a power management module of a first wireless communication device, a second connector configured to be electrically connected to a power management module of a second wireless communication device, and at least one processor configured to be electrically connected to the first connector and the second connector, wherein the at least one processor may be configured to receive a power line communication signal requesting activation of power line communication of the cradle with the second wireless communication device from the second wireless communication device through the second connector, the power line communication signal requesting activation of the power line communication of the cradle with the second wireless communication device including data related to a power line communication operation of the cradle with the second wireless communication device, and to receive a power line communication signal including data on firmware of the cradle from the first wireless communication device through the first connector.

In an embodiment, the at least one processor may be configured to transmit, to the second wireless communication device, information on whether the cradle successfully receives the data on the firmware of the cradle from the first wireless communication device through the second connector.

In an embodiment, the information on whether the cradle successfully receives the data on the firmware of the cradle from the first wireless communication device may be generated based on cyclic redundancy check (CRC), and the information on whether the cradle successfully receives the data on the firmware of the cradle from the first wireless communication device may include one of acknowledgement (ACK) or non-acknowledgement (NACK).

In an embodiment, the information on whether the cradle successfully receives the data on the firmware of the cradle from the first wireless communication device may include at least one of information indicating a download status of the data on the cradle, information on a charging state of the cradle, and information identified through a sensor of the cradle.

In an embodiment, the at least one processor may be configured to receive, from the second wireless communication device through the second connector, a power line communication signal including the data on the firmware of the cradle different from the data on the firmware of the cradle received from the first wireless communication device.

A method of operating a first wireless communication device according to an embodiment of the disclosure may include receiving a short-range wireless communication signal requesting activation of data communication with a cradle from an electronic device, identifying that the first wireless communication device is electrically connected to the cradle, receiving a short-range wireless communication signal indicating that a second wireless communication device is electrically connected to the cradle from the second wireless communication device, in response to the reception of the short-range wireless communication signal indicating that the second wireless communication device is electrically connected to the cradle, transmitting a short-range wireless communication signal requesting the second wireless communication device to activate power line communication, to the second wireless communication device, and transmitting a power line communication signal requesting the cradle to activate power line communication to the cradle.

In an embodiment, the method may further include transmitting a power line communication signal including data on firmware of the cradle to the cradle, wherein the first wireless communication device may include a first power line communication block and a second power line communication block, the first wireless communication device may be electrically connected to the cradle through one of the first power line communication block or the second power line communication block, the first power line communication block may be electrically connected to the cradle based on a first voltage, and receives power from the cradle, the second power line communication block may be electrically connected to the cradle based on a second voltage, the first voltage may be different from the second voltage, and the power line communication signal requesting the cradle to activate the power line communication may be transmitted through the first power line communication block.

In an embodiment, the short-range wireless communication signal requesting the second wireless communication device to activate power line communication may include data related to a power line communication operation of the second wireless communication device, and the data related to the power line communication operation of the second wireless communication device may include one of data instructing the second wireless communication device to transmit a power line communication signal to the cradle or data instructing the second wireless communication device to receive a power line communication signal from the cradle.

In an embodiment, the method may further include receiving, from the second wireless communication device, a short-range wireless communication signal including information on whether the cradle successfully receives the data on the firmware of the cradle.

In an embodiment, the method may further include, when the data related to the power line communication operation of the second wireless communication device includes the data instructing the second wireless communication device to transmit the power line communication signal from the cradle, transmitting only a first portion of the data on the firmware of the cradle to the cradle, wherein the remaining portion except for the first portion from the data on the cradle may be transmitted to the cradle through the second wireless communication device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore®), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A first wireless communication device, comprising:
a power management module configured to electrically connect with a cradle and execute power line communication;
a communication module configured to wirelessly communicate with an electronic device and a second wireless communication device; and
at least one processor electrically connected to the communication module and the power management module,
wherein the at least one processor is configured to:
receive a first short-range wireless communication signal requesting activation of data communication with the cradle from the electronic device via the communication module,
detect electrical connection of the first wireless communication device to the cradle,
receive a second short-range wireless communication signal indicating that the second wireless communication device is electrically connected to the cradle from the second wireless communication device via the communication module, and
in response to receiving the second short-range wireless communication signal, transmit a third short-range wireless communication signal requesting the second wireless communication device to activate the power line communication via the communication module.

2. The first wireless communication device of claim 1, wherein the power management module includes a first power line communication block and a second power line communication block,
wherein the first wireless communication device is electrically connected to the cradle through one of the first power line communication block or the second power line communication block,
wherein the first power line communication block is electrically connected to the cradle according to a first voltage, and receives power from the cradle,
wherein the second power line communication block is electrically connected to the cradle based on a second voltage, and
wherein the first voltage is different from the second voltage.

3. The first wireless communication device of claim 2, wherein the at least one processor is configured to:
transmit a power line communication signal, including data on firmware of the cradle, to the cradle through the second power line communication block, and
wherein the power line communication signal requests the cradle to activate power line communication is transmitted through the first power line communication block.

4. The first wireless communication device of claim 3, wherein the at least one processor is configured to:
receive, from the second wireless communication device, a fourth short-range wireless communication signal including information indicating whether the cradle successfully receives the data on the firmware of the cradle.

5. The first wireless communication device of claim 4, wherein, based on detecting that the cradle not successfully receives the data on the firmware of the cradle, the power line communication signal including the data on the firmware of the cradle is retransmitted to the cradle via the second power line communication block.

6. The first wireless communication device of claim 4, wherein the fourth short-range wireless communication signal includes at least one of a download status of the data on the cradle, a charging state of the cradle, and sensor information generated by a sensor of the cradle.

7. The first wireless communication device of claim 1, wherein the third short-range wireless communication signal includes data related to the power line communication through the second wireless communication device, and
wherein the data related to the power line communication through the second wireless communication device includes one of:
an instruction that the second wireless communication device to transmit a power line communication signal to the cradle, or
an instruction that the second wireless communication device to receive the power line communication signal from the cradle.

8. The first wireless communication device of claim 7, wherein the at least one processor is configured to:
when the data related to the power line communication through the second wireless communication device includes the instruction that the second wireless communication device to transmit the power line communication signal, transmit a first portion less than an entirety of data on a firmware of the cradle to the cradle, and
wherein the remaining portion excepting the first portion of the data on the cradle is transmitted to the cradle through the second wireless communication device.

9. The first wireless communication device of claim 1, wherein the at least one processor is configured to:
detect a change in a resistance value measured through the power management module to determine that the first wireless communication device is electrically connected to the cradle.

10. The first wireless communication device of claim 1, wherein the at least one processor is configured to transmit a fourth short-range wireless communication signals indicating a download status of data on the cradle to the electronic device.

11. A cradle, comprising:
a first connector configured to electrically connect to a first power management module of a first wireless communication device;
a second connector configured to electrically connect to a second power management module of a second wireless communication device; and
at least one processor electrically connected to the first connector and the second connector,
wherein the at least one processor is configured to:
receive a first power line communication signal requesting activation of power line communication of the cradle with the second wireless communication device from the second wireless communication device via the second connector, wherein the first power line communication signal includes data related to a power line communication operation of the cradle with the second wireless communication device, and
receive a second power line communication signal including first data on firmware of the cradle from the first wireless communication device via the first connector.

12. The cradle of claim 11, wherein the at least one processor is further configured to:
transmit, to the second wireless communication device, information indicating whether the cradle successfully receives the first data on the firmware of the cradle from the first wireless communication device, via the second connector.

13. The cradle of claim 12, wherein the information indicating whether the cradle successfully receives the first data on the firmware of the cradle from the first wireless communication device is generated based on a cyclic redundancy check (CRC), and further includes one of an acknowledgement (ACK) or a non-acknowledgement (NACK).

14. The cradle of claim 13, wherein the information indicating whether the cradle successfully receives the first data on the firmware of the cradle from the first wireless communication device includes at least one of: a download status of the data on the cradle, a charging state of the cradle, and sensor information generated through a sensor of the cradle.

15. The cradle of claim 11, wherein the at least one processor is further configured to:
receive, from the second wireless communication device, via the second connector, a third power line communication signal including second data on the firmware of the cradle, that is different from the first data on the firmware of the cradle received from the first wireless communication device.

16. An operation method of a first wireless communication device, the method comprising:
receiving a first short-range wireless communication signal requesting activation of data communication with a cradle from an electronic device;
detecting, via at least one processor, that the first wireless communication device is electrically connected to the cradle;
receiving a second short-range wireless communication signal indicating that a second wireless communication device is electrically connected to the cradle from the second wireless communication device;
transmitting a third short-range wireless communication signal to the second wireless communication device requesting activation of power line communication, in response to the reception of the second short-range wireless communication signal; and
transmitting a first power line communication signal requesting the cradle to activate the power line communication to the cradle.

17. The method of claim 16, further comprising transmitting a second power line communication signal includes data on a firmware of the cradle to the cradle,
wherein the first wireless communication device includes a first power line communication block and a second power line communication block,
wherein the first wireless communication device is electrically connected to the cradle through one of the first power line communication block or the second power line communication block,
wherein the first power line communication block is electrically connected to the cradle according to a first voltage, and receives power from the cradle,
wherein the second power line communication block is electrically connected to the cradle based on a second voltage,
wherein the first voltage is different from the second voltage, and
wherein the first power line communication signal requesting the cradle to activate the power line communication is transmitted through the first power line communication block.

18. The method of claim 16, wherein the third short-range wireless communication signal includes data related to a power line communication operation of the second wireless communication device, and
- wherein the data related to the power line communication operation of the second wireless communication device includes one of:
- an instruction causing the second wireless communication device to transmit a second power line communication signal to the cradle, or
- an instruction causing the second wireless communication device to receive a third power line communication signal from the cradle.

19. The method of claim 18, further comprising receiving, from the second wireless communication device, a fourth short-range wireless communication signal indicating whether the cradle successfully receives data on a firmware of the cradle.

20. The method of claim 19, further comprising:
- when the data related to the power line communication operation of the second wireless communication device includes the instruction causing the second wireless communication device to transmit the second power line communication signal to the cradle, transmitting a first portion less than an entirety of the data on the firmware of the cradle to the cradle,
- wherein a remaining portion excepting the first portion of the data on the cradle is transmitted to the cradle through the second wireless communication device.

* * * * *